US010577914B2

United States Patent
Astrid et al.

(10) Patent No.: US 10,577,914 B2
(45) Date of Patent: *Mar. 3, 2020

(54) OPTIMIZING PERFORMANCE OF A DRILLING ASSEMBLY

(71) Applicant: SHELL OIL COMPANY, Houston, TX (US)

(72) Inventors: Patricia Astrid, Amsterdam (NL); Abhay Kumar Singh, Houston, TX (US); John Edward Huhman, League City, TX (US); Matthew Alan Stoever, Houston, TX (US); Mark William Dykstra, Kingwood, TX (US); Rob Hendrikus Gerardus Marinus Grauwmans, Rijswijk (NL); Jan-Jette Blangé, Rijswijk (NL)

(73) Assignee: SHELL OIL COMPANY, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/903,272

(22) Filed: Feb. 23, 2018

(65) Prior Publication Data
US 2018/0245446 A1 Aug. 30, 2018

Related U.S. Application Data

(63) Continuation of application No. 14/432,675, filed as application No. PCT/US2013/062211 on Sep. 27, 2013, now Pat. No. 9,938,816.
(Continued)

(51) Int. Cl.
E21B 44/04 (2006.01)
E21B 21/08 (2006.01)
(Continued)

(52) U.S. Cl.
CPC .............. *E21B 44/04* (2013.01); *E21B 21/08* (2013.01); *G05B 13/021* (2013.01); *G05B 13/04* (2013.01)

(58) Field of Classification Search
CPC ....... E21B 44/04; E21B 21/08; G05B 13/021; G05B 13/04
See application file for complete search history.

(56) References Cited

U.S. PATENT DOCUMENTS 5,216,917 A 6/1993 Detoumay
5,449,047 A 9/1995 Schivley
(Continued)

FOREIGN PATENT DOCUMENTS

GB 2434289 A 7/2007
WO 8807708 A1 10/1988
(Continued)

OTHER PUBLICATIONS

International Search Report and Written Opinion for PCT Application No. PCT/US2013/062211 dated Feb. 24, 2014, 5 pages.
(Continued)

*Primary Examiner* — Charles R Kasenge

(57) ABSTRACT

A system and method for optimized control of an assembly for drilling a borehole comprises a self-tuning, multivariable controller and an optimization engine that manipulates the setpoints of the controller such that drilling performance may be continuously optimized. The method includes evaluation of a characteristic system time constant, using this constant to compute bit ROP, using computed ROP to compute process gains, which are used to tune the multivariable controller, automatically refining controller setpoints based on controller performance, and using an optimization engine to systematically adjust controller setpoints such that drilling parameters are optimized based on any of several performance indicators, or a weighted combination
(Continued)

of performance indicators. The method further comprises using at least one performance indicators which may be computed using estimated bit ROP: bit wear parameter; gradient of cost per foot; gradient of bit ROP versus WOB; simplified mechanical specific energy; and hydraulic specific energy.

16 Claims, 14 Drawing Sheets

Related U.S. Application Data

(60) Provisional application No. 61/709,208, filed on Oct. 3, 2012.

(51) Int. Cl.
G05B 13/04 (2006.01)
G05B 13/02 (2006.01)

(56) References Cited

U.S. PATENT DOCUMENTS

| | | | |
|---|---|---|---|
| 5,704,436 A | 1/1998 | Smith et al. | |
| 7,243,735 B2 | 7/2007 | Koederitz et al. | |
| 7,555,391 B2 | 6/2009 | Gleitman | |
| 7,921,937 B2 | 4/2011 | Backin et al. | |
| 7,938,197 B2 | 5/2011 | Boone et al. | |
| 8,136,609 B2 | 3/2012 | Hopwood et al. | |
| 8,186,456 B2* | 5/2012 | Tibbitts | E21B 7/18 166/55.8 |
| 8,256,534 B2* | 9/2012 | Byreddy | E21B 44/00 175/27 |
| 8,490,719 B2* | 7/2013 | Duhe | E21B 21/08 175/57 |
| 9,359,881 B2 | 6/2016 | DiSantis | |
| 9,689,249 B2 | 6/2017 | Samuel | |
| 9,938,816 B2* | 4/2018 | Astrid | E21B 44/04 |
| 10,138,721 B2* | 11/2018 | Veltman | E21B 44/00 |
| 2004/0195004 A1* | 10/2004 | Power | E21B 19/08 175/24 |
| 2005/0222772 A1* | 10/2005 | Koederitz | E21B 21/08 702/6 |
| 2007/0246261 A1 | 10/2007 | Lowe et al. | |
| 2007/0246262 A1* | 10/2007 | Brookover | E21B 21/08 175/27 |
| 2008/0093088 A1* | 4/2008 | Hopwood | E21B 19/165 166/379 |
| 2009/0229882 A1* | 9/2009 | Quernheim | E21B 44/00 175/26 |
| 2010/0108384 A1* | 5/2010 | Byreddy | E21B 44/00 175/27 |
| 2010/0175922 A1 | 7/2010 | Ignova et al. | |
| 2010/0204808 A1 | 8/2010 | Thiele | |
| 2010/0300753 A1* | 12/2010 | Hopwood | E21B 44/00 175/24 |
| 2010/0314173 A1 | 12/2010 | Hbaieb et al. | |
| 2012/0118637 A1* | 5/2012 | Wang | E21B 44/00 175/24 |
| 2012/0123756 A1* | 5/2012 | Wang | E21B 44/00 703/2 |
| 2012/0255777 A1* | 10/2012 | Bernard | E21B 21/08 175/25 |
| 2012/0255778 A1* | 10/2012 | Reckmann | E21B 44/04 175/26 |
| 2013/0032402 A1 | 2/2013 | Byreddy et al. | |
| 2013/0087385 A1* | 4/2013 | Pena | E21B 44/00 175/24 |
| 2013/0127900 A1* | 5/2013 | Pena | G09G 5/003 345/619 |
| 2013/0146358 A1 | 6/2013 | DiSantis | |
| 2014/0284105 A1* | 9/2014 | Veltman | E21B 44/00 175/40 |
| 2015/0105912 A1 | 4/2015 | Dykstra | |
| 2015/0247397 A1 | 9/2015 | Samuel | |

FOREIGN PATENT DOCUMENTS

| | | |
|---|---|---|
| WO | 2009135157 A2 | 11/2009 |
| WO | 2010101473 A1 | 9/2010 |

OTHER PUBLICATIONS

Dunlop et al., "Increased Rate of Penetration Through Automation", SPE-139897-MS, SPE/IADC Drilling Conference and Exhibition, Mar. 1-3, Amsterdam, The Netherlands, 2011, ISBN 978-1-55563-326-4.

Glowka, "Implications of Thermal Wear Phenomena for PDC Bit Design and Operation", SPE-14222-MS, SPE Annual Technical Conference and Exhibition, Sep. 22-26, Las Vegas, Nevada, 1985, ISBN 978-1-55563-625-8.

Godhavn, "Control Requirements for Automatic Managed Pressure Drilling System", SPE-119442-PA, SPE Drilling & Completion, Sep. 2010, ISSN 1064-6671.

Langston, "A Method of Utilizing Existing Information to Optimize Drilling Procedures", SPE-1262-PA, Journal of Petroleum Technology, Tulas, OK, Jun. 1966, ISSN 0149-2136.

Lummus, "Drilling Optimization", SPE-2744-PA, Journal of Petroleum Technology, Nov. 1970, ISSN 0149-2136.

Young, "Computerized Drilling Control", SPE-2241-PA, Journal of Petroleum Technology, Apr. 1969, ISSN 0149-2136.

Koederitz et al., Real-Time Optimization of Drilling Parameters by Autonomous Empirical Methods, SPE-139849-MS, SPE/IADC Drilling Conference and Exhibition, Mar. 1-3, Amsterdam, The Netherlands, 2011, ISBN 978-1-55563-326-4.

Florence et al., "Real-Time Models for Drilling Process Automation: Equations and Applications", SPE-128958-MS, IADC/SPE Drilling Conference and Exhibition, Feb. 2-4, New Orleans, Louisiana, USA, 2010, ISBN 978-1-55563-280-9.

Waughman et al, "Real-Time Specific Energy Monitoring Reveals Drilling Inefficiency and Enhances the Understanding of When to Pull Worn PDC Bits", SPE-74520-MS, IADC/SPE Drilling Conference, Feb. 26-28, Dallas, Texas, 2002, ISBN 978-1-55563-940-2.

Dupriest et al., "Maximizing Drill Rates with Real-Time Surveillance of Mechanical Specific Energy", SPE-92194-MS, SPE/IADC Drilling Conference, Feb. 23-25, Amsterdam, Netherlands, 2005, ISBN 978-1-61399-015-5.

Pessier et al., "Quantifying Common Drilling Problems with Mechanical Specific Energy and a Bit-Specific Coefficient of Sliding Friction", SPE-24584-MS, SPE Annual Technical Conference and Exhibition, Oct. 4-7, Washington, D.C., 1992, ISBN 978-1-55563-500-8.

Teale, "The Concept of Specific Energy in Rock Drilling", International Journal of Rock Mechanics and Mining Science, vol. 2, pp. 57-73, 1965.

* cited by examiner

OPTIMIZING PERFORMANCE OF A DRILLING ASSEMBLY

CROSS REFERENCE TO EARLIER APPLICATIONS

This is a Continuation application of U.S. application Ser. No. 14/432,675, filed 31 Mar. 2015, which is a national stage application of International application No. PCT/US2013/062211, filed 27 Sep. 2013, which claims priority from U.S. provisional application No. 61/709,208, filed 3 Oct. 2012. The disclosures of the International application No. PCT/US2013/062211 and the U.S. provisional application No. 61/709,208 are incorporated herein by reference.

TECHNICAL FIELD OF THE INVENTION

The present invention relates to a system and method for optimizing the drilling performance of a drilling assembly for drilling a borehole in an earth formation.

BACKGROUND OF THE INVENTION

Wellbores are generally drilled using a drilling rig that supports and rotates a drill string having a drill bit at its lower end. Drilling rigs employ either a block and tackle or hydraulic means to raise and lower the drillstring, and may employ a rotary table or a top drive to rotate the drillstring. Fluid is circulated through the drillstring and bit to clean the bit and wellbore. A downhole motor or turbine is sometimes used near the bit to allow drilling to progress with or without rotation of the drillstring at the surface; for example, when directional drilling operations are conducted.

The drillstring initially hangs in tension with its weight supported by a hook on the travelling portion of the suspension system. The hook also supports the top drive or Kelly and swivel used to rotate and circulate through the drillstring. The total load carried by the hook is commonly referred to as hook load (HL), and is often reported in units of pounds force or Newtons.

The drilling sequence typically begins by increasing the pump strokes per minute (SPM) until a desired flow rate (Q) of drilling fluid, typically expressed in gallons per minute or litres per minute, is circulated through the drillstring and borehole. The pump pressure ($P_p$), typically expressed in pounds per square inch or bar, required to circulate at a given flow rate with the bit off bottom is herein referred to as the off-bottom pressure or pressure tare (PT). Bit rotation is then established by rotating the drillstring at the surface and/or by pumping through a downhole motor or turbine. Bit rotation speed $\omega_b$, typically expressed in revolutions per minute (RPM), is computed from the sum of surface rotation speed $\omega_s$ and motor/turbine rotation speed $\omega_m$, where the latter is typically computed as the product of flow rate and a motor/turbine factor with units of rotations per unit volume of fluid circulation.

The drilling sequence continues by lowering the drillstring into the well via the suspension system. When the bit makes contact with the bottom of the hole, a portion of the weight of the drill string is consumed at the bit-formation interface as the bit penetrates the formation. This load is commonly referred to as the weight on bit (WOB), and is typically expressed in pounds force or Newtons. WOB is computed by subtracting the instantaneous hook load with the bit on bottom from the value recorded with the drillstring off bottom, herein referred to as the off-bottom hook load or hook load tare (HLT).

Torque, usually expressed in foot-pounds or Newton-meters, must be applied at the surface to rotate the drillstring and/or counteract the torque generated by the downhole motor as the bit drills ahead. The torque required to rotate the drillstring while the bit is off bottom is referred to herein as the off-bottom torque or torque tare (TT). The torque consumed by the bit as it drills ahead, herein referred to as the torque on bit (TOB) or differential torque, may be computed by subtracting the torque tare from the instantaneous torque measured with the bit on bottom. TOB is, in general, proportional to WOB.

The circulation pressure with the bit on bottom may be higher than that with the bit off bottom, especially when a downhole motor or turbine is used. The difference between the instantaneous pump pressure when the bit is on bottom and the pressure tare is referred to herein as the differential pressure (DP). When a downhole motor is used, DP is directly proportional to the output torque of the motor, which, for motors placed near the bit, is equivalent to TOB. Manufacturers of downhole motors often publish tables or charts showing the constant of proportionality between DP and motor output torque, often expressed in terms of foot-pounds per psi or Newton-meters per bar, for a given flow rate. These constants provide a secondary means for estimating TOB; that is, DP and flow rate are measured, the constant is obtained from the table, and the TOB estimate is computed.

The rate of penetration (ROP) of the bit into the formation, usually reported in units of feet per hour or meters per hour, depends on the magnitudes of the weight on bit, the bit rotation speed and the flow rate. The torque on bit is also dependent on these parameters.

If the rate at which the drill string is lowered at the surface exceeds the rate at which the bit can penetrate the formation at its instantaneous combination of WOB, $\omega_b$ and Q, the WOB increases until a state of equilibrium is attained, at which point the bit ROP is identical to the drill string descent velocity at the surface, which is also known as block descent velocity (BDV), top drive descent velocity (TDV), or surface ROP (SROP). If, as drilling proceeds, a softer formation is encountered and BDV is less than the rate at which the bit can penetrate the formation at its instantaneous combination of WOB, $\omega_b$ and Q, the load on the bit "drills off" as the drill string extends until the WOB and drill string descent rate are once again in equilibrium. The time required to reach equilibrium, alternately referred to herein as the time required to reach steady state, depends on a number of factors, including well depth, drill string composition and formation properties.

Drilling performance is often quantitatively assessed in terms of cost per foot drilled (CPF) or average ROP over a hole section or a bit run, and is affected by uncontrollable and controllable factors. The former include characteristics of the geological formation, the pore and fracture pressure gradients, subsurface temperature gradients and the vertical depth at which formations are encountered. The latter include factors specified prior to drilling, such as the type of drilling fluid used and the composition of the drillstring (including type of downhole motor used), and factors that can be manipulated while drilling proceeds, such as pump stroke rate (which, for a given pump configuration, governs flow rate of the drilling fluid into the wellbore), rotary speed of the drill string and BDV. These manipulated variables (MV), in turn, affect parameters that can be measured and controlled, herein referred to as control variables (CV), such as WOB, TOB, the total torque required at the surface to rotate the drillstring, circulating pressure measured at the surface, downhole motor differential pressure, et cetera.

The selected values, or magnitudes, of the manipulated and controlled drilling parameters highly influence the efficiency of the drilling process. For example, ROP generally increases substantially linearly with increased WOB, but there is a limit to this relationship, as the drilling process becomes inefficient at high values of WOB as a result of factors such as increased wear of the drill bit, bit balling, insufficient borehole cleaning, and drill string vibration. The latter can include axial vibration, lateral vibration or torsional vibration. Also, the drilling process may become inefficient at relatively low values of WOB, especially when drilling into hard geological formations. Moreover, the transient effects on WOB, TOB and ROP caused by variations in formation characteristics and downhole conditions further complicate identification and maintenance of parameters that optimize the drilling performance of the drilling assembly.

Historically, manipulation of BDV to maintain a desired value of WOB or some other control variable has been done manually by the driller. More recently, control systems on drilling rigs have been augmented to include "automatic drillers" (auto-drillers) that use computer logic to manipulate BDV such that target values (also known as setpoints) for certain control variables are maintained. Proportional-integral-derivative (PID) or Heuristic controllers are often employed for this purpose. Some auto-drillers allow multiple control variables to be considered simultaneously, for example surface ROP, WOB and motor differential pressure. In this case, the controller adjusts the BDV until the lowest value that causes a setpoint to be reached is found. The process is known as a "low select." The ability of the controller to hold the desired setpoints depends on its structure and tuning. Proper tuning requires quantification of the dynamic response of the system, which changes as drilling conditions change. Procedures for quantification of system response, such as step tests, are well known in the controls industry, but these can be time consuming and are not commonly applied as drilling progresses. As a result, the ability of auto-drillers to hold setpoints is suboptimal, and "overshoot" of control variables can cause machine protection limits to be reached. This interrupts the drilling process and forces the driller to intervene to correct the situation. The lost time contributes to increased cost per foot and decreased average ROP.

The setpoints themselves are selected by the driller based on experience, theory, or analysis of drilling data from other wells that have been drilled in the vicinity. Methods for identifying combinations of drilling parameters that, if used, will minimize a given objective function (e.g. cost per foot) have been described in the literature, but these require analysis of historical data in an area, constructing empirical models that provide a "best fit" of the data, and using them to find preferred parameter combinations. These approaches are limited in that they (1) are time consuming, (2) require availability of offset data to calibrate models, (3) are only applicable over ranges of drilling parameters used in offset wells, (4) are heavily dependent on bit attributes that are difficult to ascertain and can vary widely from one design to another, and (5) are only marginally applicable to wells where different formations and/or different well trajectories are used. In view thereof, drilling operations typically do not operate at optimum conditions but rather at constant values of weight on bit, rotary speed, and flow rate of drilling fluid, which values are expected to work well.

More recently, routines for closed loop control have been described, including the use of either minimum mechanical specific energy (MSE) or maximum ROP as the objective and manipulation of drilling parameters to construct response surfaces for ROP vs. WOB and rotation speed (RPM) so as to identify local maxima. These approaches are limited in usefulness because they are either (1) highly sensitive to noise in drilling data, and thus require considerable computational overhead; (2) ineffective because they require excessive time to implement, during which drilling is conducted using sub-optimal combinations of parameters; (3) incomplete because they do not effectively address constraints that should limit parameter selection, e.g. indications of dynamic dysfunction.

Hence, there is a need for a system and method for control and optimization of drilling parameters that avoids the shortcomings of existing systems.

SUMMARY OF THE INVENTION

The objective of the invention is to provide an improved system and method for optimizing drilling performance of a drilling assembly for drilling a borehole in an earth formation. The system comprises (1) a self-tuning, multivariable controller that enables improved, simultaneous maintenance of desired setpoints for a number of drilling variables, and (2) an optimization engine that manipulates the setpoints of the controller such that drilling performance is continuously optimized. The multivariable controller (1) evaluates a characteristic system time constant, (2) uses this time constant to compute bit ROP, (3) uses computed bit ROP to compute process gains which, in turn, are used to tune the multivariable controller, (4) automatically refines controller setpoints based on controller performance.

The optimization engine systematically adjusts controller setpoints such that drilling parameters are optimized based on any of several performance indicators, or a weighted combination of performance indicators. The optimization method uses the following performance indicators, all of which are computed using estimated bit ROP: (1) a bit wear parameter; (2) the gradient of cost per foot; (3) the gradient of bit ROP versus WOB; (4) simplified mechanical specific energy; and (5) hydraulic specific energy.

The method further comprises using two-step, three-step, or drill-off scanning procedures to evaluate the objective functions. The method further comprises using estimated steady-state values of objective functions to accelerate the scanning process. The method further comprises using weighting functions to combine results from individual objective functions. The method further comprises computing weighting functions using statistical measures. The method further comprises using a steady state detection algorithm to determine whether or not to begin or terminate scanning procedures. The method further comprises setting the BDV setpoint such that some other CV considered in the low select algorithm governs drawworks control when drilling conditions are not steady.

As described in detail below, according to the invention, optimization is achieved by perturbing manipulated variables and assessing how controlled variables and objective functions change in response to those perturbations. The changes either verify that operation is optimal or point to combinations of operating parameters will yield improved performance. Some embodiments systematically vary a single MV to quantify effects on CV and objective functions, while other embodiments simultaneously vary multiple MV, for example BDV and bit speed, such that the product of TOB and bit rotation speed is held constant. Manipulated variables employed within the invention include block descent velocity, surface rotation speed and flow rate. Parameters are controlled such that limiting values of BDV, hook load, WOB, TOB, total rotating torque, downhole motor differential pressure, total circulating pressure, surface rotation speed, bit speed, measured surface vibration severity and measured downhole vibration severity are not exceeded. The present methods do not require offset data to be available, and are thus applicable in exploration drilling. Still further, the present methods are computationally efficient and use commonly available drilling measurements such as block descent velocity, hook load, surface torque, surface rotation speed, pump stroke rate, flow rate and surface pressure.

DETAILED DESCRIPTION OF THE DRAWINGS

The invention will be described hereinafter in more detail and by way of example, with reference to the accompanying drawings in which.

DETAILED DESCRIPTION OF THE PREFERRED EMBODIMENTS

The System: Self-Tuning Multivariable Controller

Figure 1:
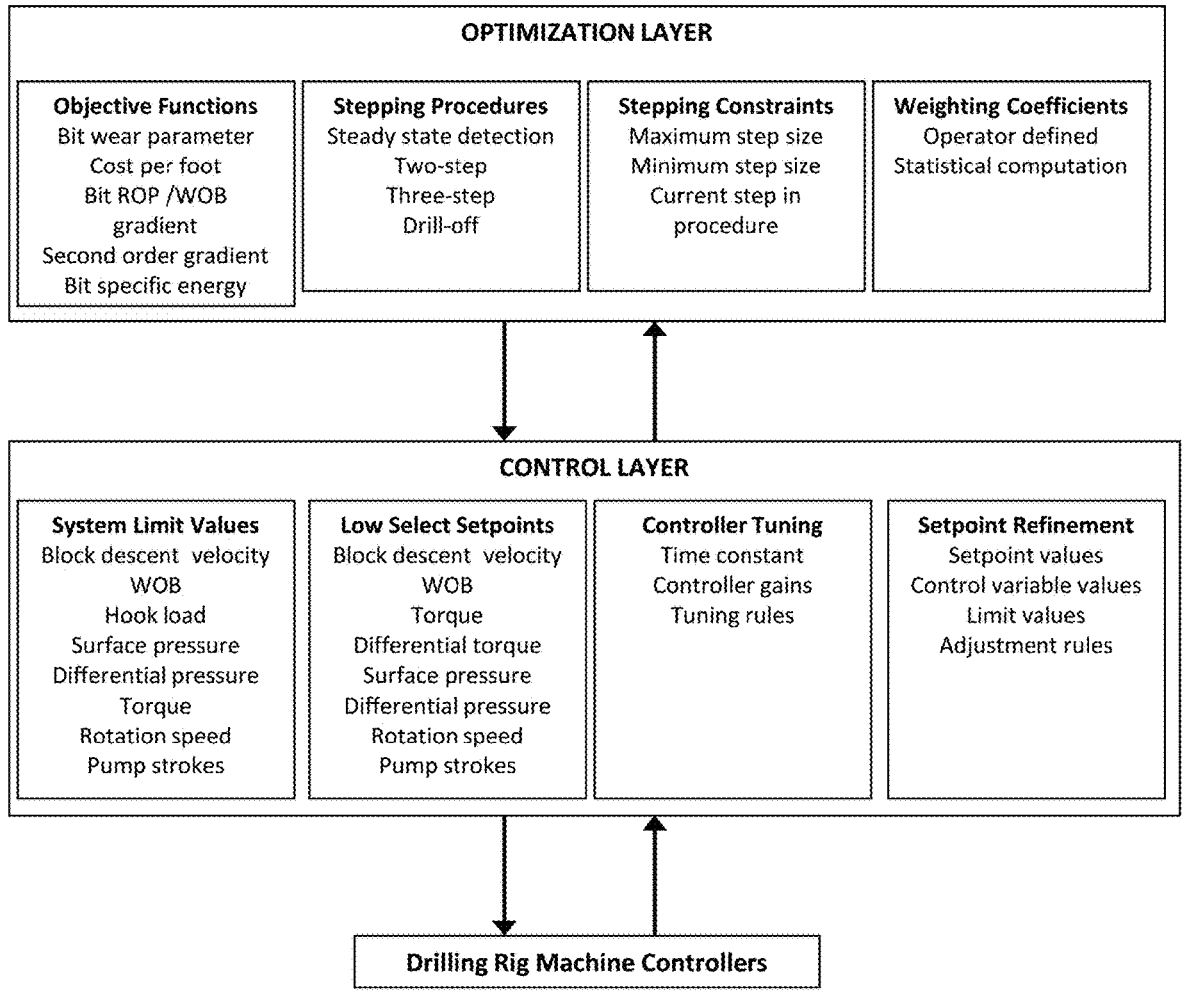
FIG. 1 is a schematic diagram showing the two levels of control provided by an embodiment of the system.
Figure 2:
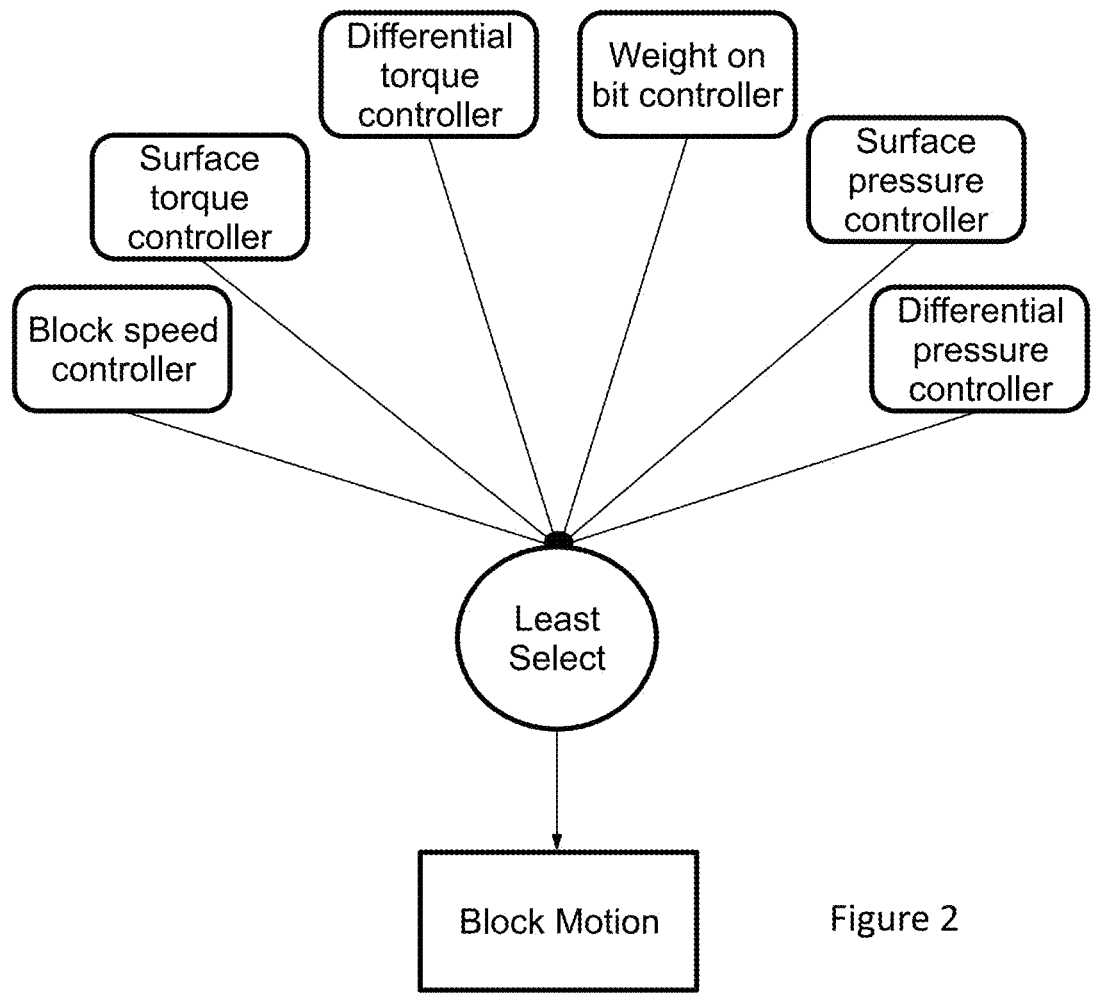
FIG. 2 is a schematic of the "low select" algorithm for control of block descent velocity.
Figure 3:
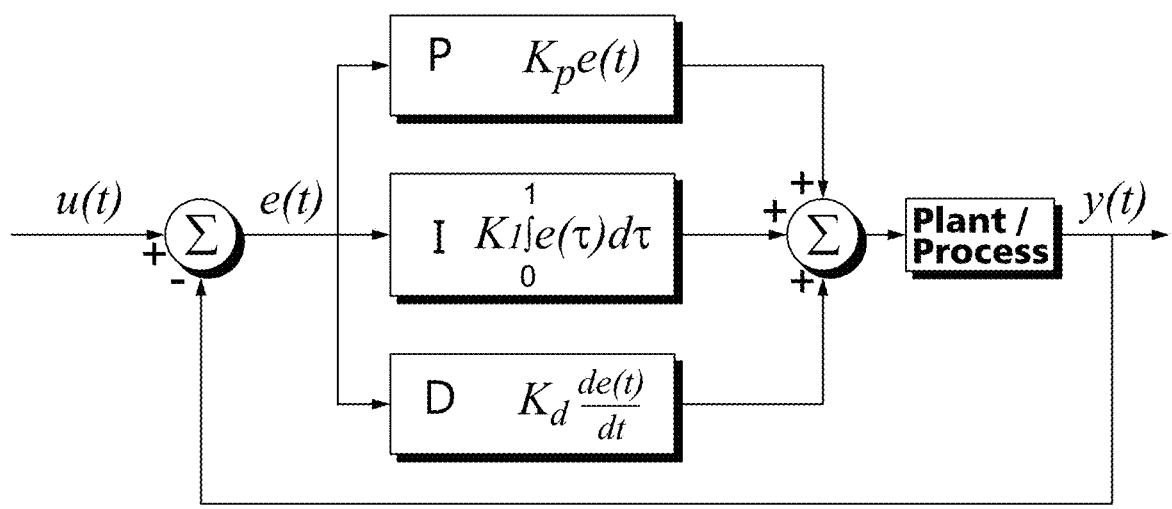
FIG. 3 is a schematic of a proportional-integral-derivative (PID) controller.

FIG. 1 presents a structural view of the drilling control and optimization system. The control layer comprises a self-tuning, multivariable controller that enables improved, simultaneous maintenance of desired setpoints for a number of drilling variables. FIG. 2 provides examples of variables that can be used as the basis for control. In a preferred embodiment, the controllers for each of these variables are of the proportional-integral-derivative (PID) type, a block diagram of which is provided in FIG. 3. The standard form of the governing equation for a PID controller is provided below.

$$z = K_C e + \frac{K_C}{T_I} \int_0^\tau e \, d\tau + K_C T_D \dot{e} \quad (1)$$

In the above equation z is the controller output, e is the error (defined as the setpoint minus the process variable value at the current time), $K_C$ is the controller gain, alternately known as the proportional gain, and $T_I$ and $T_D$ are time constants for integral and derivative terms, respectively. The integral time constant is alternately referred to herein as the reset time. An alternate form of the PID equation, known in the art as the ideal form, is used in some cases, wherein $$\frac{K_C}{T_I}$$

is referred to as the integral gain ($K_I$) and $K_C T_D$ as the derivative gain ($K_D$).

Figure 4:
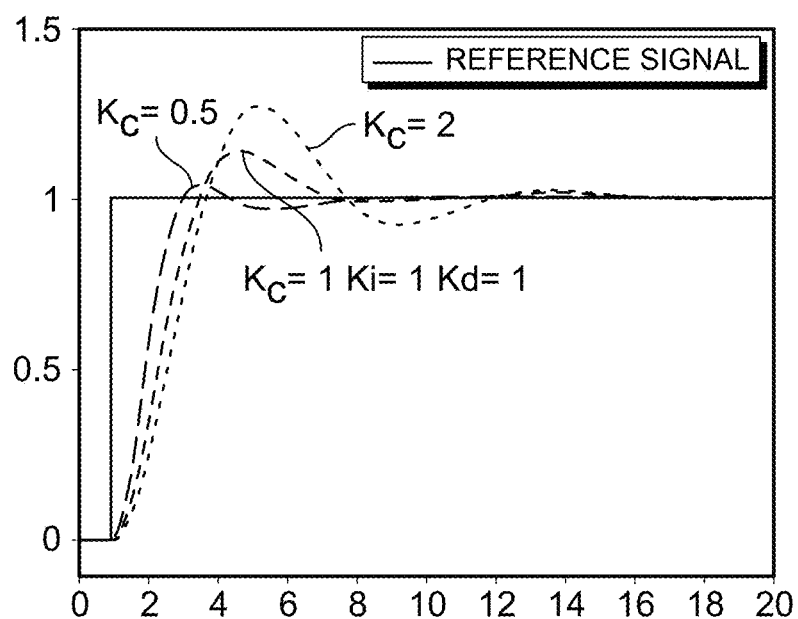
FIG. 4 is a schematic showing a process variable versus time for three values of proportional gain $K_P$ with integral and derivative gains $K_I$ and $K_D$ held constant.
Figure 5:
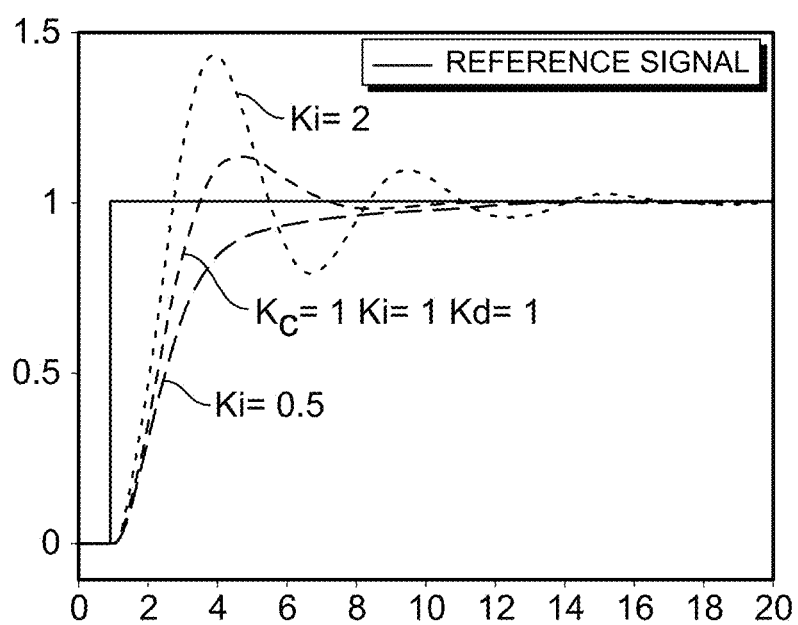
FIG. 5 is a schematic showing a process variable versus time for three values of integral gain $K_I$ with proportional and derivative gains $K_P$ and $K_D$ held constant.
Figure 6:
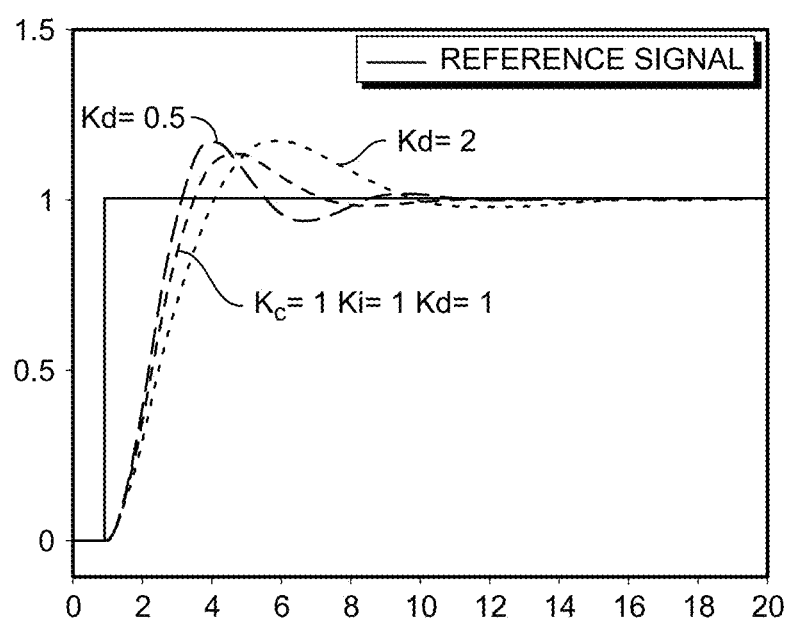
FIG. 6 is a schematic showing a process variable versus time for three values of derivative gain $K_D$ with proportional and integral gains $K_P$ and $K_I$ held constant.

The performance of such controllers is typically described in terms of stability, rise time, settling time and overshoot. Rise time is the time required to reach a desired setpoint when it is changed. Settling time is the time required for a process variable to enter and remain within a specified error band after a change in setpoint. Overshoot is the maximum value the process variable reaches during the settling time. The effects of the gain terms on rise time, settling time and overshoot are shown in FIGS. 4, 5, and 6.

Designing and tuning a PID controller can be difficult if short rise and settling times and high stability are required. Some processes have a degree of non-linearity, so parameters that work well at full-load conditions do not work when the process is starting up from no-load. PID controller performance can generally be improved by careful tuning, and performance may be unacceptable with poor tuning. The present invention ensures optimal controller performance by continually tuning the controller based on instantaneous drilling conditions.

The System: Optimization Engine

Figure 7:
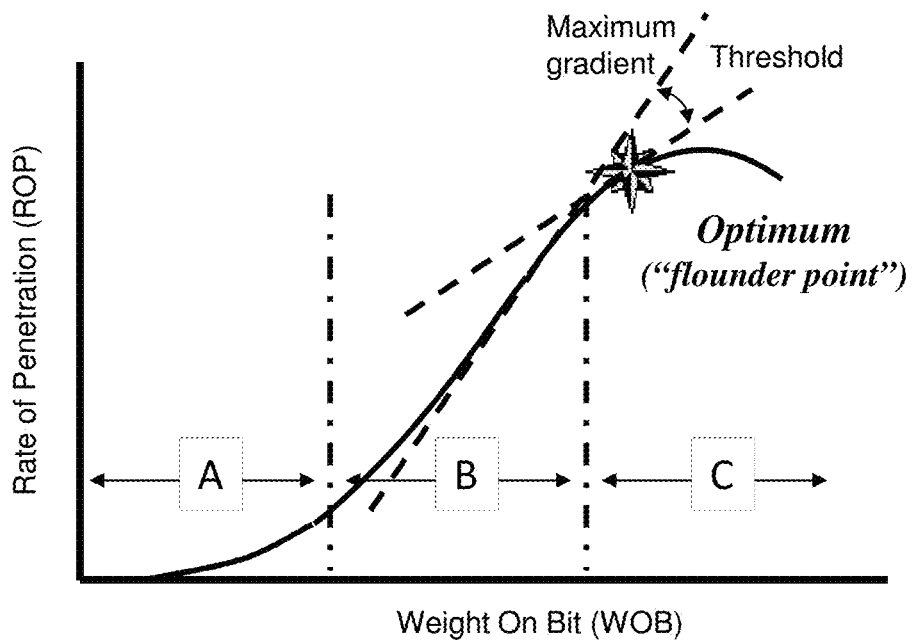
FIG. 7 is a schematic showing optimum WOB and ROP based on the ROP:WOB relationship.

The optimization layer comprises a computation engine that manipulates the setpoints of the control layer such that drilling performance is continuously optimized. As is known in the art, optimization is generally achieved by minimizing or maximizing a given objective function. FIG. 7 provides an example of how this can be achieved using rate of penetration (ROP) as the objective function. The diagram presents a curve representing ROP as a function of weight on bit (WOB) for a drill bit within a drilling assembly (not shown) used in an exemplary embodiment of the system and method of the invention. When drilling with values of WOB in the range labelled A, the rate of penetration increases more than linearly with weight on bit. Expressed differently, the gradient (or slope of the curve) increases with increasing weight on bit. When values in the range labelled B are used, the ROP increases substantially linearly with WOB; that is, the gradient is substantially constant in the range labelled B. When values of WOB in the range labelled C are used, the ROP increases less than linearly with weight on bit, or expressed differently, the gradient of the curve decreases with increasing weight on bit. The transition point on the curve, which represents the gradient decreasing below its maximum value by an amount denoted "threshold", is referred to as the "flounder point." This point can be considered an optimal WOB for incremental return of ROP.

Other parameters, for example the mechanical specific energy (MSE), can also be used as objective functions. MSE represents the amount of mechanical energy consumed to remove a unit volume of rock during rotary drilling operations. It is often computed using the equation from Teale shown below.

$$MSE = \frac{WOB}{A_b} + \frac{120\pi T\omega}{A_b ROP} \quad (2)$$

where WOB is the weight on bit defined previously, $A_b$ is the area of the bit, T may be either the torque applied at the surface or the torque on bit (TOB), $\omega$ may be either the bit rotary speed or the surface rotary speed, and ROP is rate of penetration. In practice, the first term on the right hand side is much smaller than the second, so a simplified expression (SMSE) can be used, and is preferable:

$$SMSE \equiv \frac{120\pi T\omega}{A_b ROP} \quad (3)$$

SMSE has the units of energy per unit volume, which reduce to units of stress. Laboratory and field studies have shown that in a given rock, the minimum achievable value of specific energy is related to the rock strength.

Figure 8:
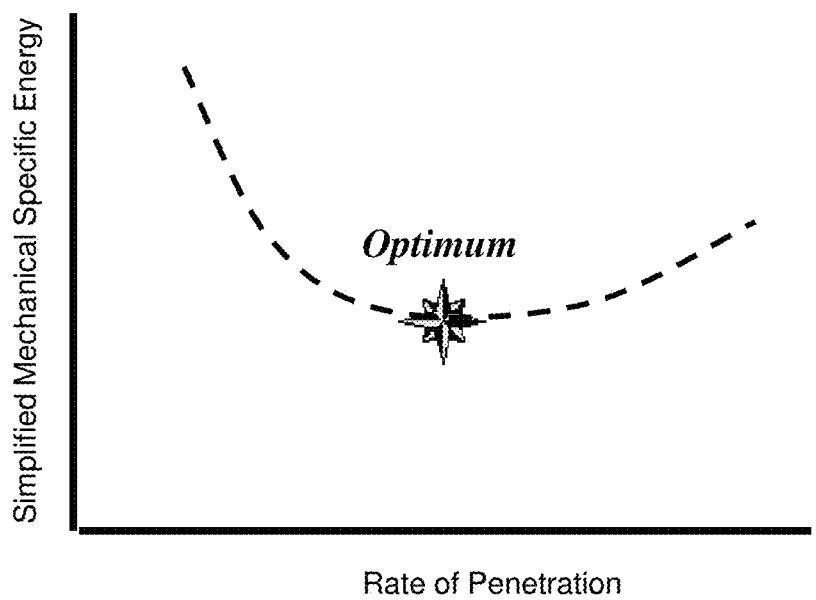
FIG. 8 is schematic showing optimum ROP based on the SMSE:ROP relationship.

FIG. 8 presents a graph of SMSE as a function of ROP that is established, for example, by manipulating ROP, measuring steady state values of WOB, torque and rotary speed, and computing SMSE. The ROP at which SMSE reaches its minimum may be selected as optimal based on energy input for incremental ROP gain.

In a preferred embodiment of the present invention, these and other objective functions are considered, their inputs are weighted and combined, and the result is used to determine if the manipulated variable should be increased, decreased or held constant.

The Method: Self-Tuning Multivariable Controller

Figure 9:
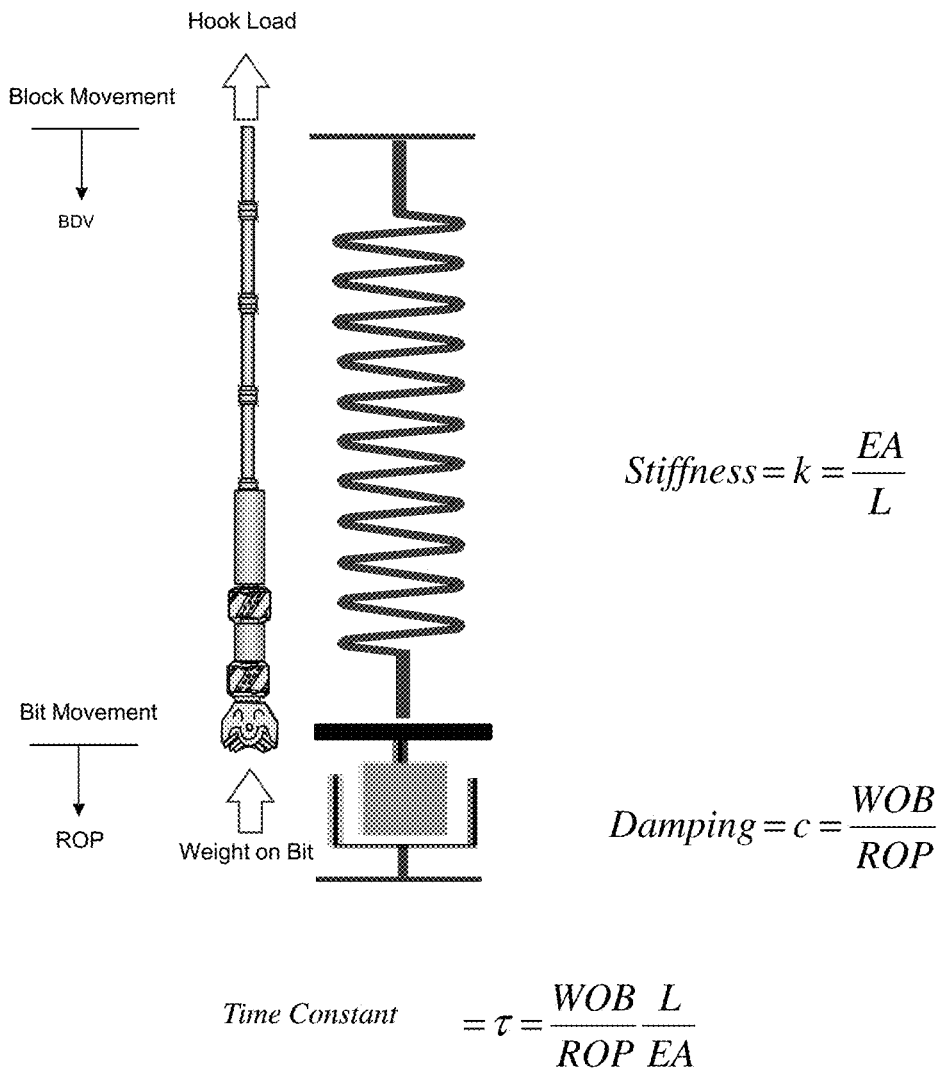
FIG. 9 is schematic showing a first order model of the drilling system.

A preferred embodiment of the invention involves representing the axial motion of the drilling system using a spring-damper model as shown in FIG. 9. The first order differential equation that describes bit velocity using this model is shown in Eq. 4.

$$\frac{c}{k}\frac{dv_{Bit}}{dt} + v_{Bit} = v_{Block} \quad (4)$$

The bit velocity ($v_{Bit}$) is equivalent to the rate of penetration (ROP), and block velocity ($v_{Block}$) is referred to elsewhere in this document as BDV. The invention quantifies the damping coefficient c and stiffness coefficient k as follows:

$$c = \text{damping} = \frac{WOB}{ROP} \quad (5)$$

$$k = \text{stiffness} = \frac{EA}{L} \quad (6)$$

The invention quantifies the characteristic time constant for the axial motion of the drilling system using the ratio of damping to stiffness:

$$\tau = \text{time constant} = \frac{WOB}{ROP}\frac{L}{EA} \quad (7)$$

In the above equations, L is the total length of the drill pipe in the drillstring, E is the modulus of elasticity of the material from which the drill pipe is made, and A is the cross sectional area of the drill pipe. The above equations assume a single size of drill pipe is used, but this not always the case in practice. When multiple drill pipe sizes are used, an equivalent axial stiffness for the assemblage may be computed from known equations for springs in series.

The solution of Eq. 4 allows the bit ROP at any given time t to be estimated from the measured BDV. One useful form of this solution is $$ROP(t) = f(BVD) = BDV(t)\left(1 - e^{-\frac{\Delta t}{\tau}}\right) + ROP(t - \Delta t)\left(e^{-\frac{\Delta t}{\tau}}\right) \quad (8)$$

In this expression BDV(t) is the block descent velocity at the current time (t), $\Delta t$ is the elapsed time between the previous and current measurements of drilling variables, and ROP(t−$\Delta t$) is the previous estimate of bit ROP. Per the equation, the current estimate of bit ROP is obtained by applying a first order filter to the measured block descent velocity f(BDV), where the time constant of the filter is obtained from system properties and recent drilling data as per Eq. 7.

In preferred embodiments, the time constant r is continuously calculated and is limited by a user-specified minimum value and a maximum value expressed as a factor of drill string length, or, equivalently, bit depth.

The process gain $K_P$ for each control variable (CV) of interest, for example WOB, differential pressure, circulating pressure, differential torque, or total torque, is defined as the change in that variable for a given change in BDV. Preferred embodiments of the invention compute these process gains as $$K_P = \frac{CV}{f(BDV)} \quad (9)$$

Preferred embodiments filter the measured control variable using, for example, a low pass filter, before computing the process gain. Note this value of $K_P$ is bulk, or overall, gain in the CV per TDV. The actual process gain of most interest to the controller will be the differential gain at the setpoint value. This differential gain is likely to be somewhat higher than the bulk gain, because the slope tends to be lower at small values of TDV, and increases near the bit floundering point. However, bulk gain is much more easily calculated than differential gain and tends to correlate well with differential gain. Some embodiments of the present invention use a closed-loop time constant in the controller equations that is based on the characteristic time constant computed as above but is adjusted to compensate for an underestimate of process gain.

As with $\tau$, $K_P$ is preferably continuously calculated. Since values of WOB and ROP are required for the computations, the values can only be updated while drilling is in progress with the bit on bottom. Otherwise, previously-calculated time constants and bulk gains are used.

Preferred embodiments of the invention use the time constant $\tau$ and process gains $K_P$ to compute the proportional gain constant $K_C$, the reset time $T_I$ and the derivative time $T_D$ for the PID controllers for each control variable of interest. Some embodiments may set one or more of these constants to zero for a controller or controllers.

Figure 10:
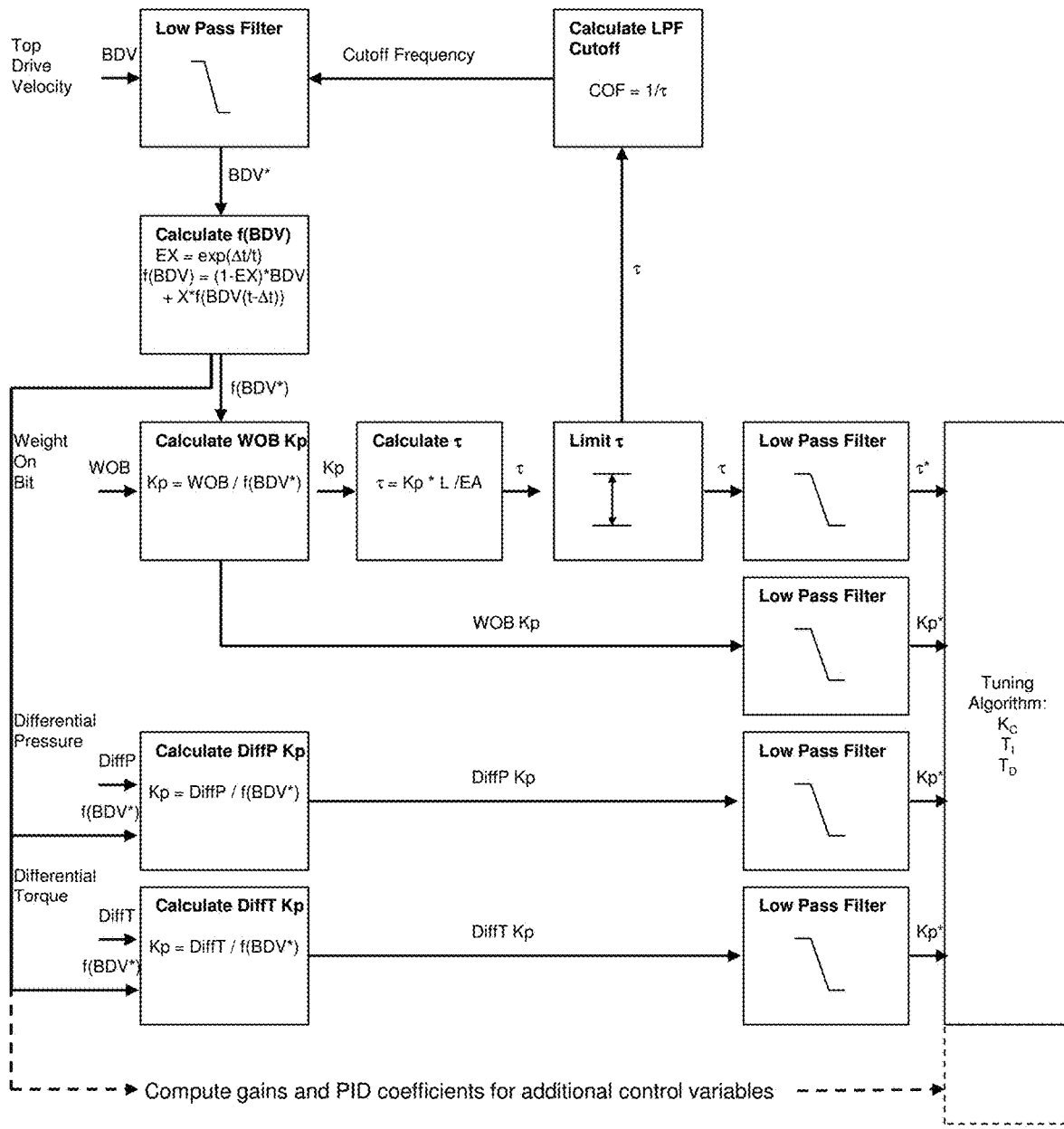
FIG. 10 is schematic showing the controller parameter computation procedure.

The preferred computation procedure is shown in block form in FIG. 10. The measured BDV is preferably filtered using, for example, a low pass filter. The first order filtered value of BDV, represented as f(BDV), is then computed using, for example, Eq. 8. The most recently computed value of system time constant $\tau$ is used for this computation. The measured value of WOB is preferably filtered using, for example, a low pass filter, and the bulk process gain for WOB is then computed using Eq. 9. This result is used to compute an updated estimate of the system time constant using Eq. 7, and is also passed to the PID tuning algorithm, preferably after being filtered using, for example, a low pass filter. The updated system time constant $\tau$ is compared to predefined minimum and maximum values and, if greater or less than specified maximum or minimum values, is set to the minimum or maximum value, as appropriate. The time constant is used to compute the cutoff frequency for low pass filters that are preferably used to filter the manipulated variable BDV and control variables. The updated, and adjusted if necessary, time constant is also passed to the tuning algorithm, preferably after being filtered using, for example, a low pass filter.

Bulk process gains for other control variables of interest, for example differential pressure, total circulating pressure, differential torque, total rotating torque, are then computed using Eq. 9. The gains are then passed to the PID tuning algorithm, preferably after being filtered using, for example, a low pass filter.

A number of approaches for selecting PID controller constants $K_C$, $T_I$ and $T_D$ are known in the art, including manual methods, the Ziegler-Nichols method, and the Cohen-Coon method. Commercial software is also available for PID tuning. The present invention uses an approach based on the internal model control (IMC) tuning algorithm. It uses the process gain and time constant calculations described previously, and allows for manual and automatic adjustment of the controller's speed of response. The controller constants are preferably obtained from the following expressions:

$$K_C = \frac{1}{K_P} \frac{(C_1 \tau + C_2)}{(C_3 \tau_c + C_4)} \quad (10)$$

$$T_I = C_5 \tau + C_6 \quad (11)$$

$$T_D = C_7 \tau + C_8 \quad (12)$$

The closed loop time constant for the controller $\tau_c$ and constants $C_i$, i=1,8 in the above equations may be specified by the operator. Alternately, the parameters may be computed as functions of process gains and the system time constant.

The tuning calculations are preferably performed continuously, but some embodiments apply them to the controllers intermittently. The time between updates may be, for example, a user-specified multiple of the latest computed system time constant $\tau$. Alternately, or in combination, updates may be applied only if PID controller constants $K_C$, $T_I$ or $T_D$ differ from previously computed values by a specified minimum, or by a specified minimum rate per minute. Some embodiments of the invention may limit updates of $K_C$, $T_I$ or $T_D$ based on specified maximum amounts of change, based for example on percent difference from previous values, or based on rate of change compared to previous values. Preferred embodiments also allow the auto-tuning function to be enabled or disabled by a user.

When drilling is proceeding in a manner that indicates the absence of dysfunction, it is often desirable to have the setpoints for the control variables of interest as close to the limiting values as practicable. If the setpoints are too near the limits, changes in drilling conditions can cause the limits to be encountered, which may in turn cause an interruption to the drilling process—and incremental drilling expense due to lost time—while the driller intervenes. The present invention, therefore, includes a method for continuously assessing the performance of active controllers and adjusting the proximity of setpoints to limits.

Preferred embodiments quantify controller performance constantly by computing the variation V of each CV within a moving window, defined as the maximum value of the CV minus the minimum value of the CV, and comparing with the setpoint value SP and limit value, also referred to herein as the interlock value I. The length of the moving window is preferably a user-specified multiple of the time constant $\tau$. During normal operation, the setpoint optimization function computes a new CV setpoint SP(t) as follows:

$$\text{Target Set Point} = TSP = \frac{K_1}{100} I - K_2 \frac{V}{2} \quad (13)$$

$$SP(t) = SP(t - DT) + [TSP - SP(t - DT)] K_3 \frac{DT}{100} \quad (14)$$

In the equations above DT is the algorithm execution time, $K_1$ is a user-specified maximum percentage of the interlock value I that the setpoint can reach, $K_2$ is a user-specified parameter that represents steady-state variation of the CV, and $K_3$ is a user-specified parameter representing the rate at which the target SP is approached per second. The maximum value of $$K_3 \frac{DT}{100}$$

is limited to 1.0.

If and when a limit value is reached and a process interlock occurs, the drilling parameter setpoint is reset so that it does not exceed a separately specified maximum fraction of the interlock value $K_4$:

$$SP(t) = \text{minimum}\left[SP(t), \frac{K_4}{100}I\right] \quad (15)$$

The algorithm is preferably executed such that DT is equal to the moving window length. It is preferably executed for a given controller whenever the controller is enabled and the bit is on the bottom drilling, regardless of whether the particular controller's output is selected by the low-select function. As the system time constant τ increases, the moving window length increases correspondingly and thus adjustments are made less frequently.

Preferred embodiments allow the setpoint optimization function to be enabled or disabled by the user.

The Method: Optimization Engine

One embodiment of the present invention comprises an optimization engine that computes setpoints for use in the controller layer such that drilling parameters are optimized based on any of several performance indicators, or a weighted combination of performance indicators. The optimization engine may be used in "automatic" or "auto" mode, in which said setpoints are passed directly to the controller layer which, in turn, actuates rig equipment. The optimization engine may also be used in "manual" mode, in which setpoints are presented to an operator for review, acceptance and, if desired, modification before being passed to the control layer. The optimization engine may also be used in "monitor" mode, in which computations are performed and results presented to the operator and archived for later examination, but setpoints are not passed to the control layer.

A first performance indicator used in preferred embodiments is derived from the relationship between bit ROP and WOB represented graphically in FIG. 7, where bit ROP is computed from BDV using, for example, Eq. 8. The flounder point shown in the figure can be considered optimal in terms of incremental ROP for a given increase in WOB.

Embodiments may identify the flounder point in any of a number of ways. If desired, multiple approaches may be used, and the maximum, minimum or average of the values identified may be taken as the optimal combination of bit ROP and WOB.

One approach, described already and shown in FIG. 7, involves repeatedly computing the gradient of the bit ROP versus WOB curve using measurements from different BDV setpoints and identifying the BDV and WOB beyond which the gradient decreases, or decreases by more than a threshold value. The threshold may be expressed in relative terms, for example as a percentage of the gradient value, or in absolute terms, for example a given quantity of distance per unit time per unit force.

A second approach, closely related to the first, is to consider the change of gradient values a second order gradient; that is, the second derivative of the curve representing the bit ROP-WOB relationship. In region A of FIG. 7, and the lower portion of region B, the second order gradient is positive. As bit ROP increases, the second order gradient approaches zero and, eventually, becomes negative. The ROP:WOB pair at which the second order gradient becomes negative, or falls below zero by more than a threshold amount, may be taken as the flounder point.

Figure 11:
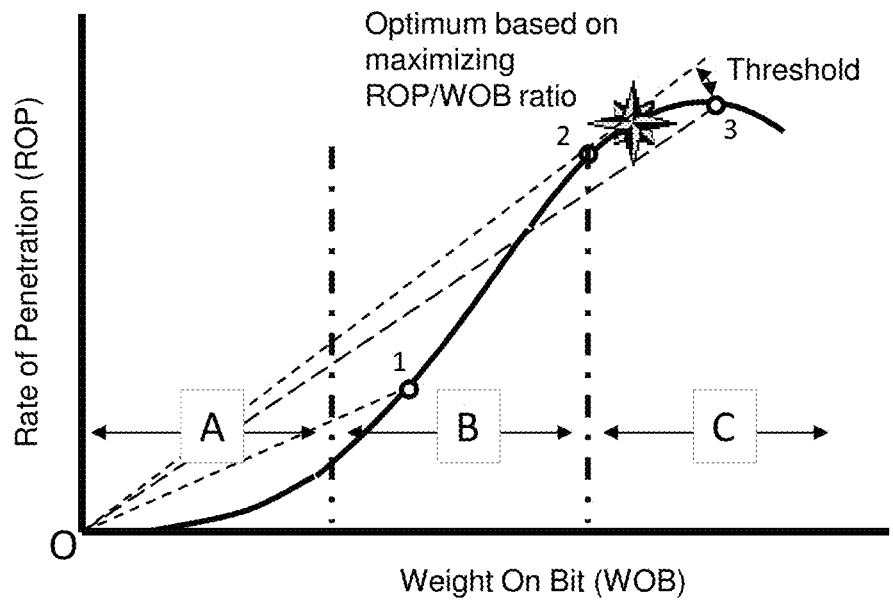
FIG. 11 is schematic showing optimum WOB and ROP based on the ROP/WOB ratio.

A third approach for identifying the flounder point is depicted in FIG. 11, in which successive values of the ratio of bit ROP to WOB are shown by noting that such ratios represent the slopes of lines through bit ROP:WOB pairs and the origin. Combinations of bit ROP and WOB in regions A and B in the figure are characterized by gradually increasing ratios; that is, as bit ROP increases, the ROP:WOB ratio also increases. Combinations of bit ROP and WOB in region C, however, reverse that trend. The flounder point may thus be identified as the point at which the bit ROP:WOB ratio decreases below the maximum by more than a threshold value, where the threshold is defined as above. It may be noted that the bit ROP:WOB ratio is the inverse of the bulk WOB gain used in the controller layer of one embodiment of this invention.

Figure 12:
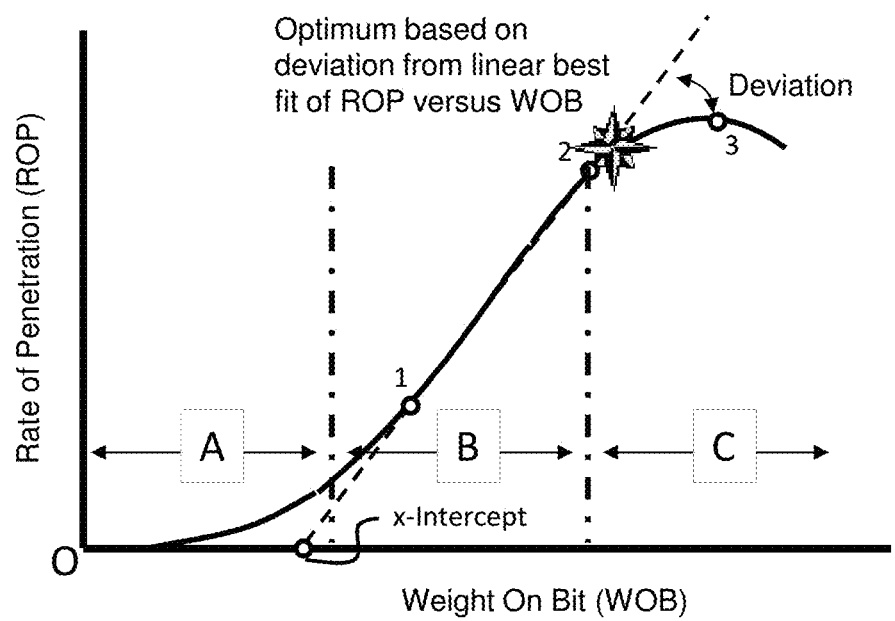
FIG. 12 is schematic showing optimum WOB and ROP based on deviation from a linear model of ROP and WOB.

A fourth approach for identifying the flounder point is shown in FIG. 12, which depicts a linear approximation of the bit ROP-WOB response constructed from two bit ROP:WOB pairs. If bit ROP:WOB pairs corresponding to BDV setpoints equal to or greater than point 2 in the figure deviate from this line by more than a threshold amount, the points can be identified as residing in region C. The highest ROP:WOB pair that remains within the threshold distance from the line may be taken as the flounder point.

A second performance indicator that may be employed in preferred embodiments of the present invention comprises a bit wear parameter (WP), which represents the volumetric wear of a cutter on the periphery of a bit per distance drilled along the well path. The expression for WP is derived from a basic assumption used in wear models known in the drill bit industry: a cutter will experience volume loss proportional to the load it carries and the distance it slides. The constant of proportionality represents the "abrasiveness" of the rock being drilled. Suitably derived, the cutter wear per distance drilled then becomes:

$$WP = \frac{\beta WOB \omega_b}{ROP} \quad (16)$$

WOB, $\omega_b$ and ROP are as defined previously. WP is preferably computed continuously using bit ROP, which in turn is computed from BDV using Eq. 8. The constant β, which accounts for formation abrasiveness and bit geometry considerations, may be set to one for the purposes of parameter optimization in a given formation. Combinations of drilling parameters that minimize WP are optimal from the standpoint of ensuring bits remain as sharp and efficient as possible for as long as possible.

A third performance indicator that may be used within the optimization engine is based on the gradient of cumulative cost per foot (CPF). CPF is computed using an equation well known in the drilling industry:

$$\frac{\text{Cost}}{\text{Foot}} = \frac{\text{Bit Cost} + \text{Rig Rate}(\text{Drilling Time} + \text{Trip Time})}{\text{Footage Drilled}} \quad (17)$$

Figure 13:
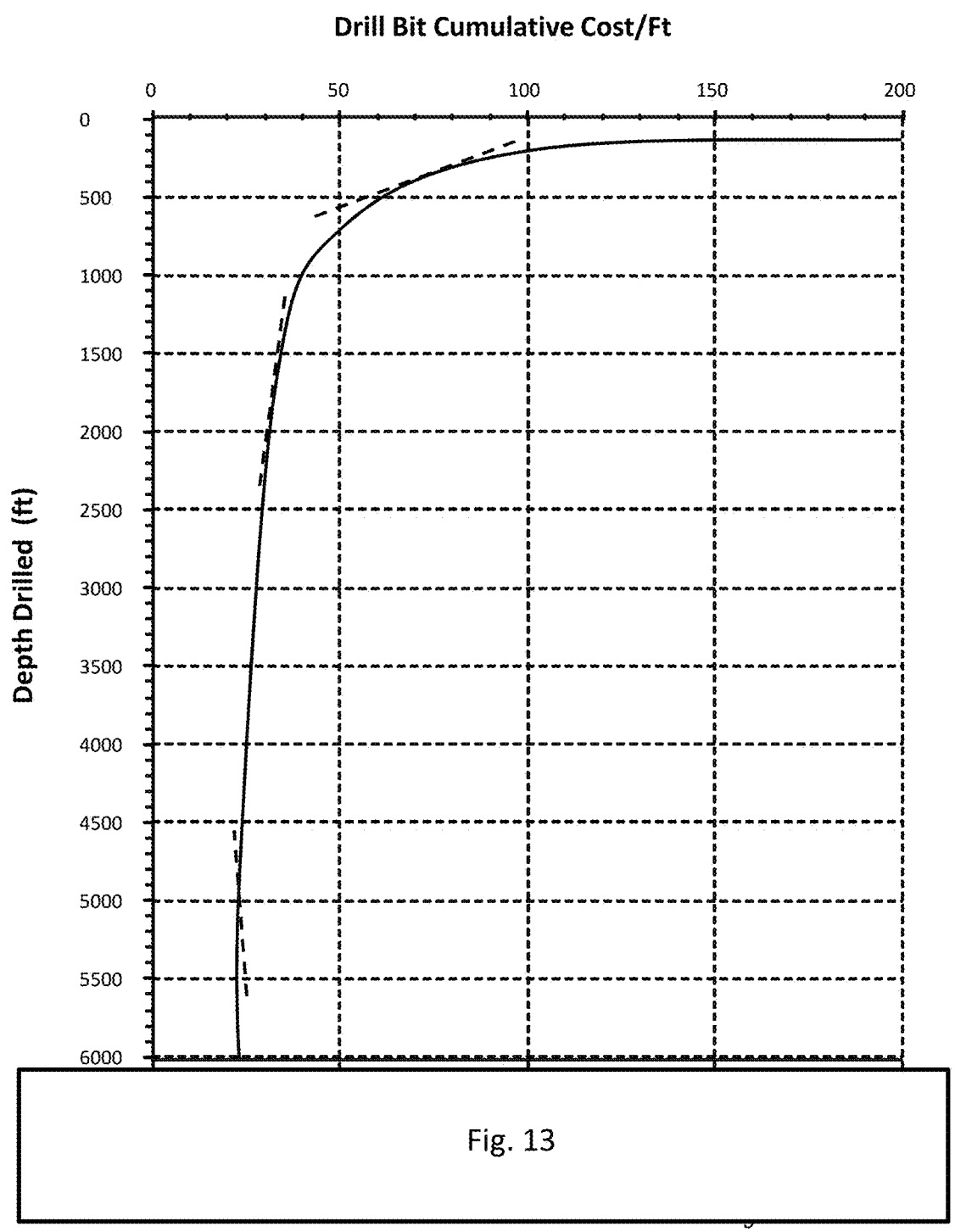
FIG. 13 is schematic showing evolution of cumulative cost per foot over a bit run.

The "bit cost" may be fixed, or may itself depend on footage drilled. The "rig rate" is the cost per unit time of the drilling equipment employed during the bit run. The "drilling time" is the cumulative time elapsed during the current bit run, which, for a given amount of footage drilled, is inversely related to average ROP. The "trip time" is the sum of the time required to trip the bit into the hole to commence drilling and to trip it back out when the hole section is complete or a different bit is required. Trip time in and out may be estimated by summing the corresponding hole depths and dividing by an average tripping rate, for example 1,000 ft per hour. The "footage drilled" is the cumulative footage drilled by the bit in the hole during its present run. The equation above can be used to compute the cumulative cost per foot during a bit run, an example of which is provided in FIG. 13. The cumulative cost per foot is initially infinite because the distance drilled is zero; as footage accumulates, the cost decreases. The gradient of the cumulative cost per foot, expressed per unit distance drilled or per unit time, can be maximized to drive the cost down to its minimum value. Combinations of parameters that maximize the gradient of cumulative cost per foot are thus desirable for minimizing drilling cost.

A fourth performance indicator that may be employed within the optimization engine is given by the simplified mechanical specific energy (SMSE) defined in Eq. 3. SMSE is preferably computed continuously using bit ROP obtained from Eq. 8, bit rotation speed and bit torque. The latter may be taken as differential torque or computed from differential pressure, as described previously. If both values are available, some combination of the two, for example, a weighted average, may be used. Combinations of parameters that minimize SMSE as shown in FIG. 8 are desirable because they minimize the energy expended to remove a unit volume of rock. Energy expended directly affects power and fuel consumption, and also affects wear of drilling equipment and thus run length, rate of penetration and maintenance and/or replacement costs.

A fifth performance indicator that may be employed within the optimization engine is given by a parameter referred to herein as hydraulic specific energy (HSE), which is defined as the hydraulic energy consumed at the bit while removing a unit volume of rock. HSE is obtained as the hydraulic horsepower supplied to the bit, a parameter well known in the drilling industry and itself obtained from the product of pressure drop across the bit and volumetric flow rate through the bit, divided by the rate of penetration. Mathematically HSE is defined as:

$$HSE = K_5 \frac{\rho_m Q^3}{A_b A_n^2 ROP} \qquad (18)$$

The flow rate (Q), rate of penetration (ROP) and bit area ($A_b$) are as defined previously. Drilling fluid density ($\rho_m$) is typically expressed in pounds mass per gallon or kilograms per cubic meter. Total nozzle area ($A_n$), also referred to in the industry as total flow area (TFA), is the sum of the cross section areas of the nozzles and/or flow passages through the bit, and is typically expressed in square inches or square centimeters. Like other specific energy expressions, HSE has units of stress (force per unit area). The constant $K_5$ in the equation above depends on the unit system employed. The hydraulic horsepower consumed while drilling is directly proportional to power and fuel consumption and wear of internal pump components, which in turn leads to non-productive rig time for maintenance and replacement part cost. Combinations of drilling parameters that minimize HSE are thus optimal from the standpoint of drilling cost reduction.

Scanning Procedures

Figure 14:
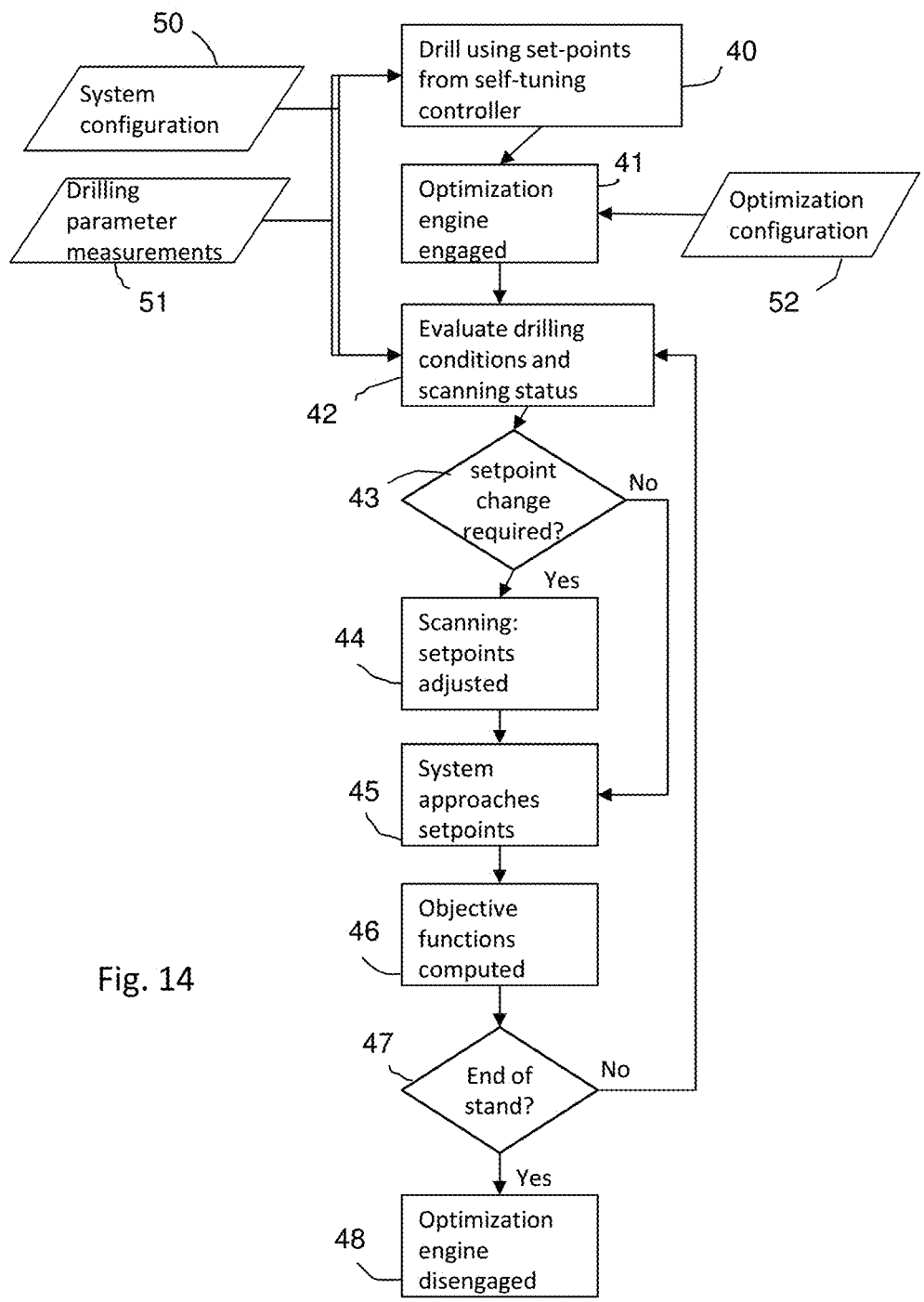
FIG. 14 is schematic showing the optimization procedure used in an embodiment of the invention.

Preferred embodiments of the invention employ scanning procedures within the optimization engine to quantify the objective functions and, in some cases, their gradients with respect to distance drilled or time. The scanning procedures are used within the execution scheme of the optimization engine as shown in FIG. 14.

In step 40 drilling proceeds in a mode governed by the self-tuning multivariable controller using setpoints initially defined by the operator, but refined via logic as described previously. Reference sign 50 represents data on geometrical information, such as bottom hole assembly (BHA) composition, casings, drill pipe, and surface equipment that are used in computations in the controller layer. Reference sign 51 represents real time measurements of drilling parameters obtained from sensors at the surface and, if available, downhole. These real time data are also used within the controller layer.

In step 41 the optimization engine is engaged and scanning and computation procedures to be followed within the engine are defined based on configuration data represented by reference sign 52. Geometrical information and real time drilling data represented by reference signs 50 and 51, respectively, are also passed to the optimization engine.

In step 42 the current drilling situation and scanning step are assessed. Factors considered include which control variable is governing block descent velocity, whether drilling parameters are changing or are steady, whether the current setpoints have been selected as part of a scanning procedure, and whether an adjustment in setpoints is required to continue or complete the current scanning procedure.

Figure 15:
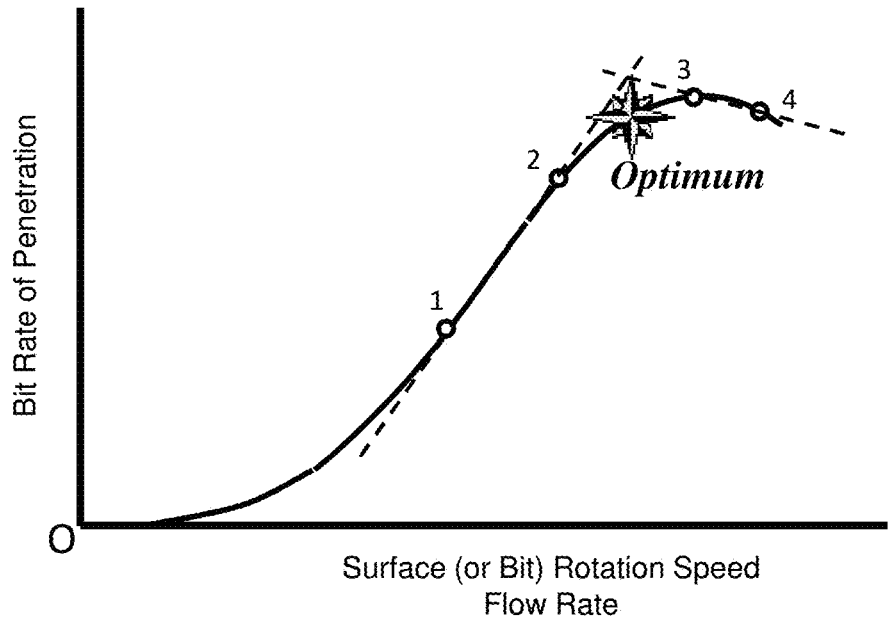
FIG. 15 is a schematic showing the two-step method of optimization based on response of bit ROP to changes in manipulated variables.

A first scanning procedure, herein referred to as the two-step method, used within the invention evaluates the objective functions of interest at two distinct MV setpoints and renders a decision regarding the next setpoint based on the gradient of the response. FIG. 15, which is a generalization of FIG. 7, provides an example in terms of the relationships between bit rate of penetration and manipulated variables such as surface (or bit) rotation speed and flow rate. If a first setpoint is that represented by point 1 in the figure, and a second is that represented by point 2, then a positive change in MV yields an increase in bit ROP. This is a favorable response, and indicates that a subsequent positive change to the MV may lead to still higher values of bit ROP. On the other hand, if a first setpoint is that represented by point 3 in the figure, and a second is that represented by point 4, then an increase in the MV yields a decrease in bit ROP, which indicates that the optimal setpoint value is somewhat lower than the current value. The condition for favorable bit ROP responses to MV setpoint changes may be written as follows:

$$\frac{\partial (bitROP)}{\partial MV} > 0 \qquad (19)$$

The symbol $\partial$ in the above equation represents the partial derivative; that is, the change in bit ROP resulting from a change in the MV of interest while holding all other process variables constant. This ratio is also referred to herein as the first order gradient of bit ROP with respect to the MV of interest.

Figure 16:
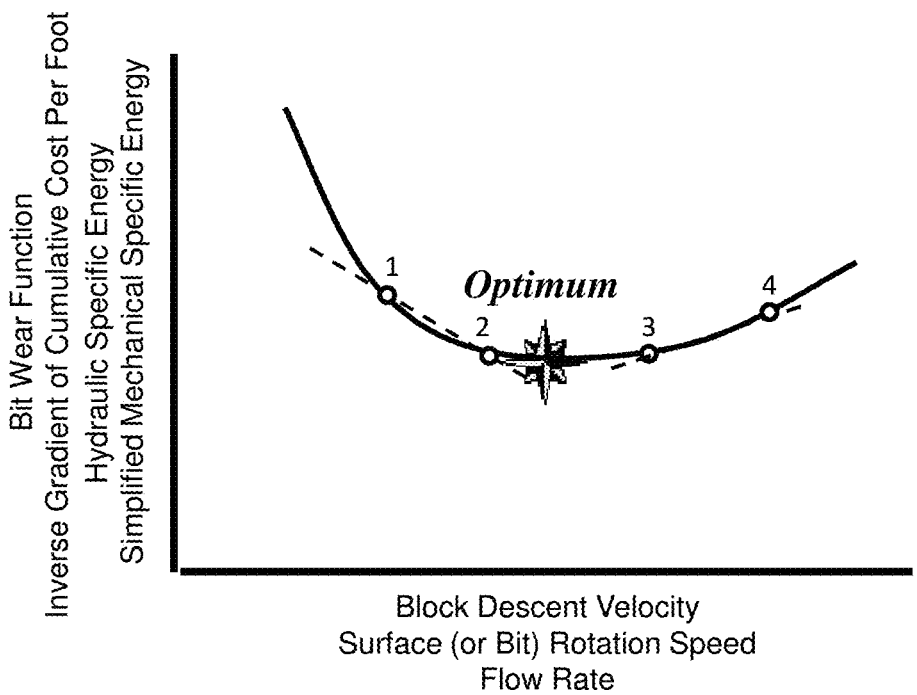
FIG. 16 is a schematic showing the two-step method of optimization based on generalized responses of objective functions to changes in manipulated variables.

FIG. 16, a generalization of FIG. 8, provides an example of two-step scanning using relationships between objective functions that should be minimized and the manipulated variables described herein. If a first setpoint is that represented by point 1 in the figure, and a second is that represented by point 2, then a positive change in MV yields a reduction of the objective function. This is a favorable response, and indicates that a subsequent positive change to the MV may lead to further reduction of the objective function. On the other hand, if a first setpoint is that represented by point 3 in the figure, and a second is that represented by point 4, then an increase in the MV yields an increase in the objective function, which indicates that the optimal setpoint value is somewhat lower than the current value. The condition for favorable responses of these objective functions to MV setpoint changes may be written as follows:

$$\frac{\partial (\text{Objective Function})}{\partial MV} \leq 0 \quad (20)$$

The criterion represented by this equation may be stated as the first order gradient of the objective function with respect to the MV of interest is equal to or less than zero.

Figure 17:
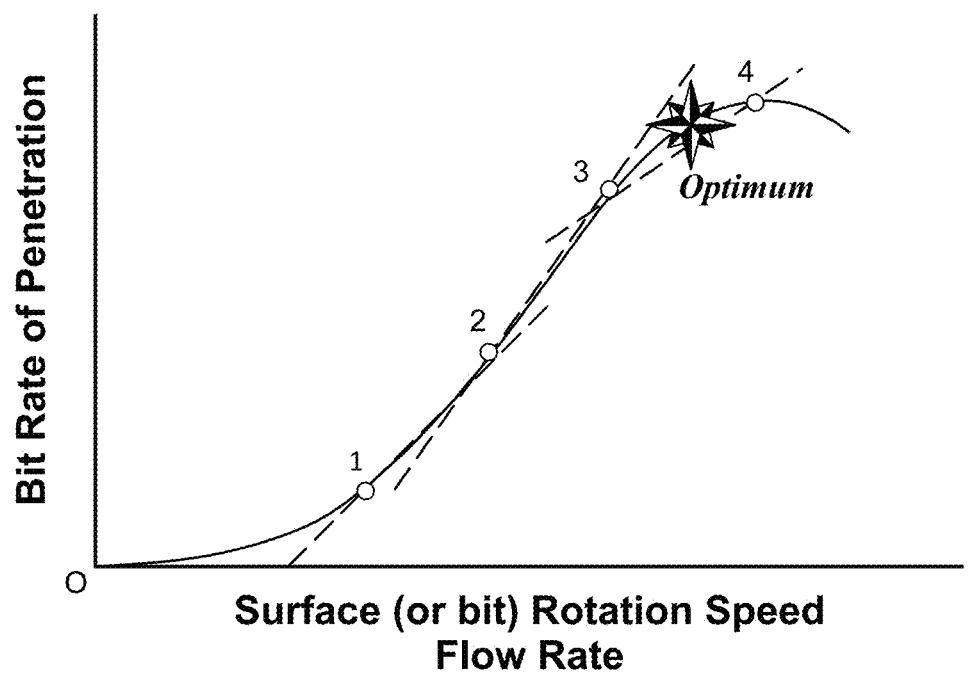
FIG. 17 is a schematic showing the three-step method of optimization based on response of bit ROP to changes in manipulated variables.

A second scanning method, herein referred to as the three-step method, that may be used within the invention evaluates the objective functions of interest at three distinct MV setpoints and renders a decision regarding the next setpoint based on the first order gradients, as described above, and also the second order gradients of the responses, where the second order gradients represent the rates of change of the first order gradients with respect to the same MV. FIG. 17 provides an example in terms of the relationships between bit ROP and MV. If a first setpoint is that represented by point 1 in the figure, a second is that represented by point 2, and a third is that represented by point 3, then two first order gradients may be computed using points 1 and 2 and points 2 and 3, respectively. If the numerical value of the second gradient is greater than that of the first gradient, then a positive change in MV between points 2 and 3 yields a larger increase in bit ROP than a positive change between points 1 and 2. This is a favorable response, and indicates that a subsequent positive change to the MV may lead to still higher values of bit ROP. On the other hand, if a first setpoint is that represented by point 2 in the figure, a second is that represented by point 3, and a third is that represented by point 4, then the numerical value of the gradient between points 3 and 4 is less than that of the gradient between points 2 and 3. This indicates that an increase in the MV between points 3 and 4 yields a smaller increase in bit ROP than a similar increase in MV between points 2 and 3, which in turn indicates that the optimal setpoint value is somewhat lower than that corresponding to point 4. The condition for favorable bit ROP responses to MV setpoint changes in terms of second order gradients may then be written as follows:

$$\frac{\partial^2 (\text{bit } ROP)}{\partial M^2} > 0 \quad (21)$$

Figure 18:
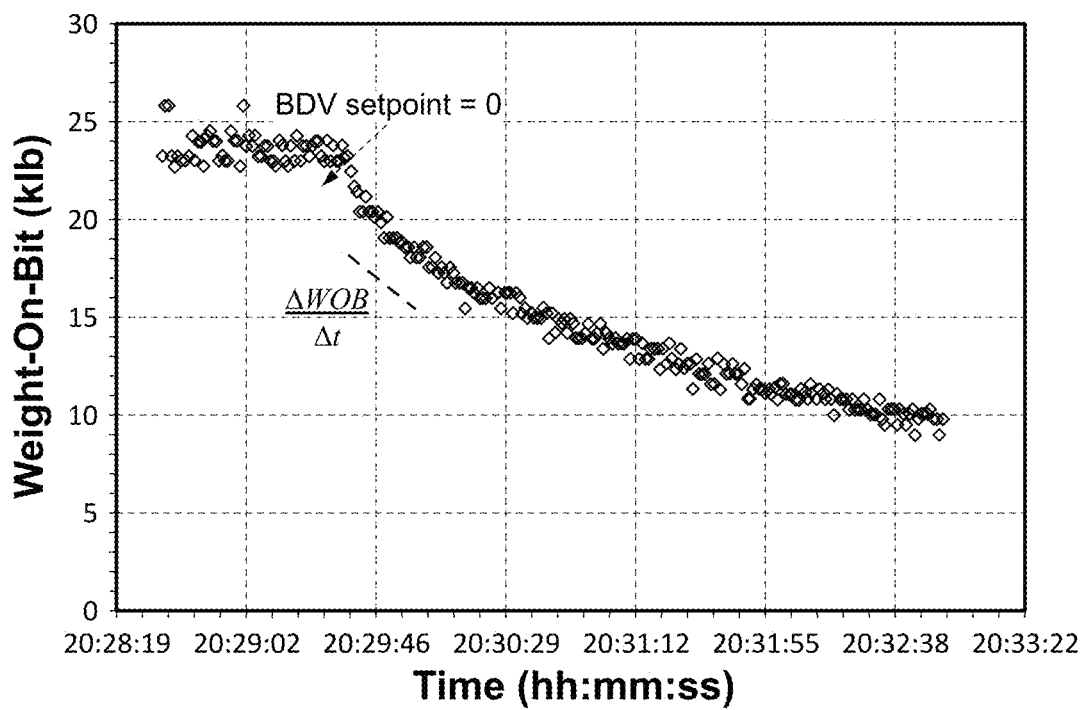
FIG. 18 is a schematic showing decay of measured WOB over time when BDV is set to zero while executing scanning via the drill-off method.

A third scanning method, herein referred to as the drill-off method, that may be employed within the invention takes advantage of the drill-off phenomenon described previously. As drilling proceeds using a given combination of MV, the block descent is temporarily halted while the other MV are held constant. The bit drills ahead as the drillstring elongates, with WOB gradually decreasing as shown in FIG. 18. The bit ROP can be estimated from the change in WOB over time by applying Hooke's law using an equation that is well known in the industry:

$$-0.95 \frac{L}{EA} \frac{\Delta WOB}{\Delta t} = \text{bit } ROP \quad (22)$$

In the equation above L represents the length of the drill pipe, A is its cross section area and E is the modulus of elasticity of the pipe tube material. The term L/EA represents the axial compliance of the drillstring assuming that only the stretch of the drillpipe is significant. The constant 0.95 compensates for the length of the drillstring that is occupied by tool joints, which are much stiffer axially than the drill pipe tube bodies.

The invention computes bit ROP using the equation above while capturing other parameters required to compute the objective functions of interest. The criteria used in the two-step and three-step approaches are then employed to identify MV setpoints.

If drilling conditions change after a scanning procedure has been completed, for example, due to rock formation changes, then the scanning procedure is repeated to ensure that setpoints are optimal for the new formation. If drilling conditions change while a scanning procedure is being executed, the validity of results from computed objective functions will be compromised and the scanning cycle is terminated until drilling conditions become steady. Preferred embodiments recognize such changes in drilling conditions by continuously computing and evaluating the averages and standard deviations of selected parameters, for example the bulk control variable gains $K_B$ described previously, over a specified sampling window that is preferably a multiple of the system time constant $\tau$. Another parameter used for identifying changes in drilling conditions is the aggressiveness ($\mu$), alternately known in the industry as the bit-specific friction coefficient, which relates torque and weight on bit and is defined mathematically as:

$$\text{Aggressiveness} = \mu = \frac{3T}{D_b WOB} \quad (23)$$

Aggressiveness is unitless, so any consistent set of units may be employed in the above equation. Weight on bit (WOB) as is defined previously, and $D_b$ is the bit diameter. The torque T in the equation is preferably torque on bit, but may also be surface torque.

According to a preferred method, each new value of a selected parameter or parameters is compared with the already existing group(s) of values. If the new value differs from the average by more than S times the standard deviation, the new value is marked as an "outlier" and excluded from the analysis. However, if P percent of similar new values are measured in the sampling window, a change of drilling conditions is indicated. Sampling window size, S and P are preferably configurable.

Step 43 evaluates scanning status and objective function values and applies control logic to determine if a change to setpoints is required, and if so, what the change should be. If scanning is in process, setpoints are selected such that they yield statistically significant differences in objective functions while honoring limits on process variables. If scanning is complete, the decision is based on a weighted combination of inputs from M objective functions. The inputs comprise diagnoses of favorability based on the criteria in Eq. 19-21. Preferred embodiments allow weighting factors $W_l$ to be selected by the operator, computed, for example based on statistical measures, or some combination of the two, where the sum of the M weighting factors is unity. The overall probability of a favorable drilling condition $P_{favor}$ is then obtained as $$P_{favor} = \sum_{l=1}^{M} P_l W_l \quad (24)$$

The probability of favorability for an individual objective function $P_l$ in the above equation is quantified by making the assumption that the distribution of its values during a scanning step is Gaussian. Consider, for example, simplified mechanical specific energy (SMSE) as the objective function, BDV as the MV, Eq. 20 as the criterion for favorability and two-step scanning. The mean of the difference in SMSE between MV set points $\Delta\overline{SMSE}$ is computed as $$\Delta\overline{SMSE} = \frac{1}{N}\sum_{j=1}^{N}[SMSE_j(BDVSP_k) - SMSE_j(BDVSP_{k-1})] \quad (25)$$

The standard deviation of the difference in SMSE between MV setpoints is computed as $$\sigma_{SMSE(BDVSP_k)} = \sqrt{\frac{1}{N}\sum_{j=1}^{N}[SMSE_j(BDVSP_k) - \overline{SMSE}(BDVSP_k)]^2} \quad (26)$$

$$\sigma_{\Delta SMSE} = \sqrt{\sigma^2_{SMSE(BDVSP_k)} + \sigma^2_{SMSE(BDVSP_{k-1})}} \quad (27)$$

The probability that Eq. 20 is satisfied is then obtained using the well-known error function erf:

$$P_{\Delta SMSE \leq 0} = \frac{1}{2}\left[1 + \mathrm{erf}\left(\frac{(0 - \Delta\overline{SMSE})}{\sigma_{\Delta SMSE}\sqrt{2}}\right)\right] \quad (28)$$

$$\mathrm{erf}(x) = \frac{2}{\sqrt{\pi}}\int_0^x e^{-t^2}dt \quad (29)$$

When the weighted probability that the current drilling condition is favorable meets or exceeds P %, then the MV setpoint is increased; otherwise, the setpoint is decreased. P is preferably specified by the operator.

The new setpoint(s) for the manipulated variable or variables are implemented in Step 44 and drilling parameters evolve as the state of the drilling system changes and a new steady state is approached in Step 45.

Figure 19:
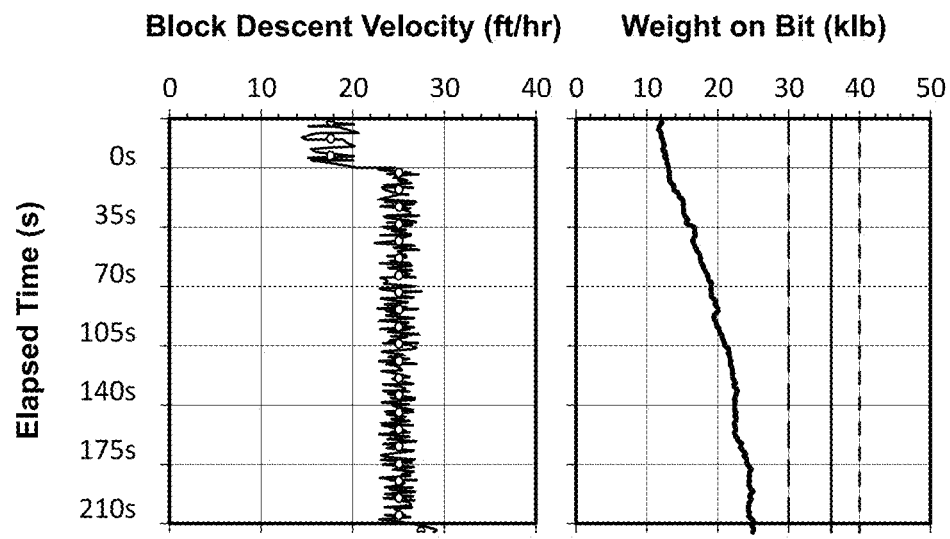
FIG. 19 is schematic showing transient drilling system behavior after a BDV setpoint change.

Step 46 involves computation of values for the selected objective functions. The validity of the computations may be compromised by formation changes, as described above, and also by transient effects in drilling system response. An example of the latter is provided in FIG. 19, which shows a gradual increase in measured WOB after a change in BDV setpoint. Note that the change in BDV is only fully reflected in the WOB measurement, and thus the penetration rate of the bit, after approximately 180 seconds has elapsed. If the average rate of penetration at the bit over that time period is 20 ft/hr, the bit will have drilled one foot in the time required for steady state to be regained. If multiple setpoints are required to fully evaluate objective functions, then several times that much rock will be drilled before an optimal combination of parameters can be identified. The amount of footage drilled while gathering sufficient steady state data to use the criteria of the two-step or three-step methods can easily be greater than the thickness of homogeneous portions of formations in the subsurface. This severely limits the usefulness of the scanning approach. If, in the interest of minimizing drilled footage while scanning, objective functions are computed before steady state conditions are attained, for example by assuming, as is common in current practice, that BDV and bit ROP are equivalent regardless of the timing of changes to BDV, then objective functions will be computed erroneously. This also severely limits the utility of the scanning approach.

The present invention overcomes these difficulties through further application of the first order system model represented in FIG. 9 and Eq. 7-8. Making the assumption that all CV affected by mechanical load on the bit are proportional to bit ROP, it follows that $$CV(\text{steady state}) = CV(t - \Delta t) + \frac{CV(t) - CV(t - \Delta t)}{\left(1 - e^{-\frac{\Delta t}{\tau}}\right)} \quad (30)$$

After each change to the BDV setpoint, the invention applies the above equation to the control variables of interest to test for convergence of predicted steady state values. Once converged, they are used to compute the objective functions of interest, at which point the next step in the scanning procedure can be executed. Using projected steady state values in this manner reduces the time and drilled footage consumed while executing the scanning procedure, which in turn increases its effectiveness and value.

Step 47 evaluates the current block position and determines if drilling needs to be interrupted to add drill pipe. If not, steps 42 through 47 are repeated. If so, the procedure proceeds to Step 48, in which the optimization engine is disengaged and the responsibility for selection of setpoints is returned to the driller.

Approaches for Simultaneously Varying BDV and RPM

The methodologies described above seek to optimize a single MV or CV by systematically varying it while quantifying the effects on other CV and performance indicators. The invention also comprises methods of simultaneous variation of multiple MV and CV to expedite multi-parameter optimization. These methods regulate the mechanical power (MP) supplied to the bit based on the hydraulic power (HP) supplied and implied formation properties, as described below. The methods are particularly useful when subsurface strata are heterogeneous.

The mechanical power supplied to the bit is related to the simplified mechanical specific energy defined previously herein, and is given by:

$$MP = K_6 TOB \, \omega_b \quad (31)$$

Figure 20:
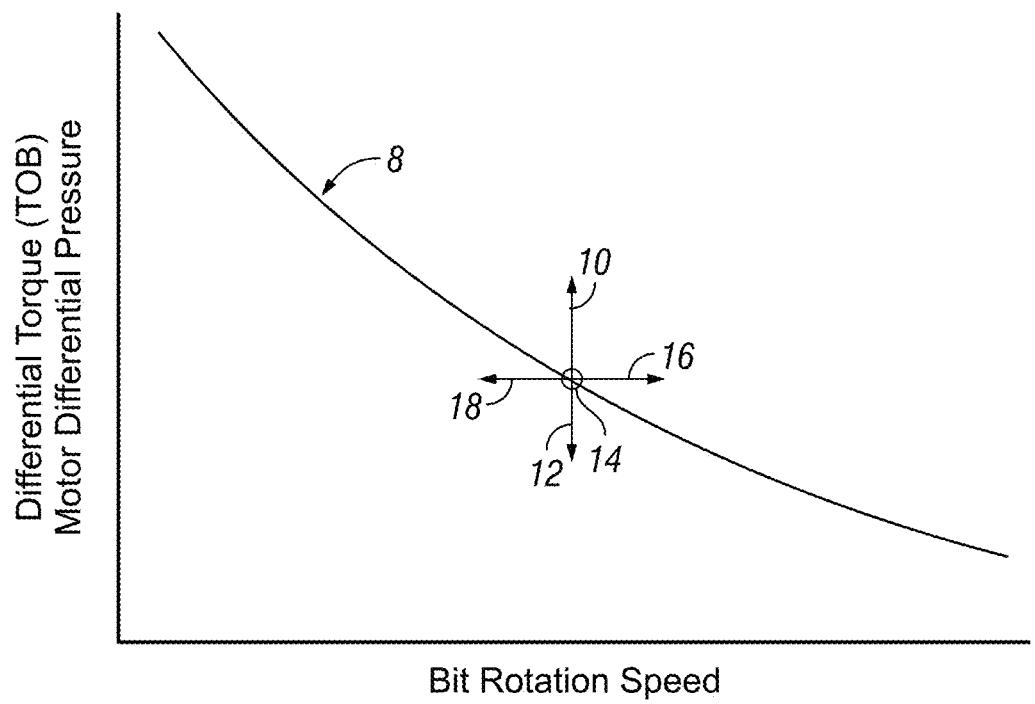
FIG. 20 is a schematic showing Example of possible simultaneous variations of TOB and bit rotation speed ($\omega_b$)
Figure 21:
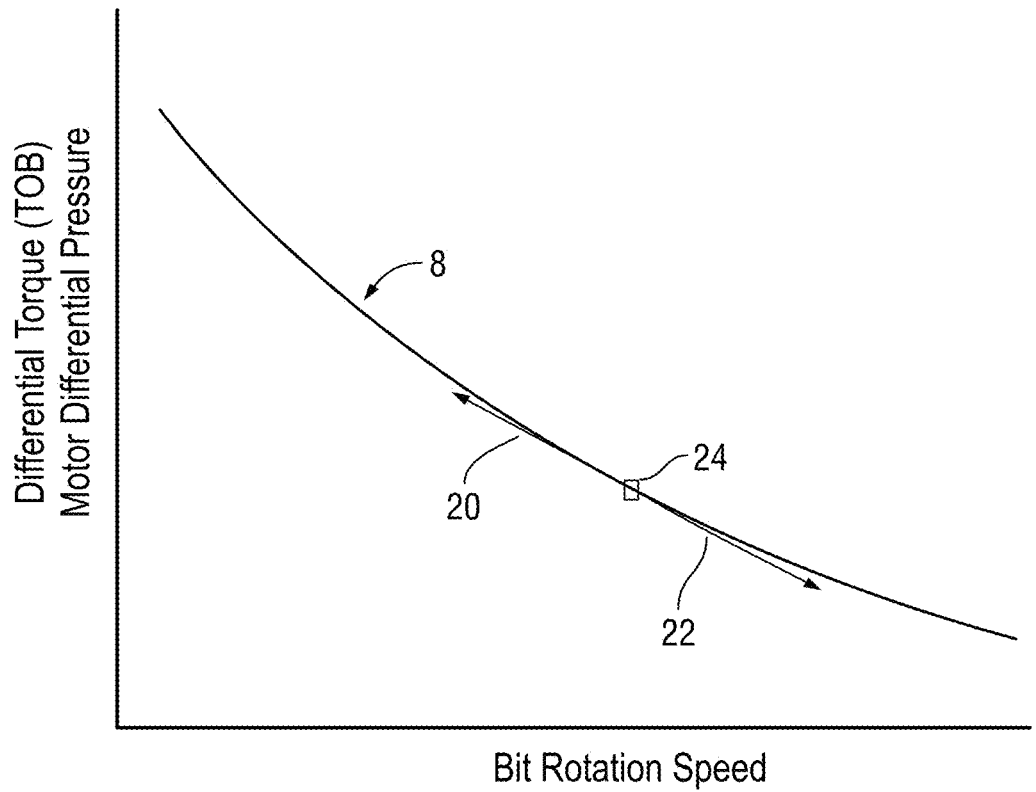
FIG. 21 is a schematic showing examples of simultaneous variations of TOB and bit rotation speed ($\omega_b$) for constant mechanical power.

The differential torque (TOB) and bit rotation speed ($\omega_b$) are as defined previously, and the constant $K_6$ depends on the unit system employed. FIG. 20 shows differential torque or, equivalently for cases where downhole motors are used, differential pressure, versus bit rotary speed ($\omega_b$), wherein curves 8 represent points at which the mechanical power supplied to the bit is substantially constant. Arrows 10, 12 each represent possible stepwise variations of TOB from a setpoint 14 on the curve 8, and arrows 16, 18 each represent possible separate stepwise variations of $\omega_b$ from the setpoint 14, each of which, done independently, results in a change to the mechanical power supplied to the bit. Arrows 20, 22 in FIG. 21 each represent possible stepwise variations of both TOB and $\omega_b$ from a setpoint 24 on the curve 8, wherein the variations 20, 22 may be carried out simultaneously and are selected such that the MP supplied to the bit remains substantially constant as the relative contributions of TOB and $\omega_b$ to total MP change. Control of MV and CV in this manner is advantageous for preventing drilling dysfunctions such as accumulation of cuttings on the bit face, also referred to herein as bit balling, and lateral bit vibration, also referred to herein as bit whirl. Bit balling is likely when drilling soft formations with excessive TOB and insufficient $\omega_b$, since TOB is proportional to the size of the cuttings generated in a given formation, and the size of the cuttings directly affects the tendency for accumulation on the bit face. Drilling such formations is thus best done with a proportionally higher contribution of $\omega_b$ to MP. Bit whirl, on the other hand, is likely when drilling hard formation with insufficient TOB and excessive $\omega_b$. TOB is indicative of the level of engagement between the bit and the hole bottom, which, when insufficient, allows cutting forces that are inherently unbalanced as the bit penetrates the rock to cause small lateral displacements which, in turn, increase the magnitude of the imbalance forces. The centrifugal forces that arise due to simultaneous rotation and translation of the bit are proportional to the square of $\omega_b$ and contribute to the self-perpetuation of this process. Drilling hard formations, then, is best done using proportionally higher contributions of TOB to MP. The invention thus regulates relative contributions of TOB and $\omega_b$ to MP based on formation strength by applying Eq. 31 and the following expression for bit speed:

$$\omega_b \text{ Formation Strength} = K_7 \quad (32)$$

The constant $K_7$ in the above acts as a scaling factor, or reference value, for the formation strength term and is preferably specified by the operator.

Since formation strength is not generally known, parameters that are affected by formation strength may be used in its stead. Examples include simplified mechanical specific energy (Eq. 3), the bit wear parameter (Eq. 15) and the x-intercept of the bit ROP versus WOB curve (FIG. 12), which are all directly proportional to formation strength, and bit aggressiveness (Eq. 23) and the slope of the bit ROP versus WOB curve (FIG. 12), which are inversely proportional to formation strength.

The hydraulic power supplied to the bit is related to the hydraulic specific energy defined previously herein and is given by:

$$HP = K_7 \frac{\rho_m Q^3}{A_b A_n^2} \quad (33)$$

The flow rate (Q), bit area ($A_b$), drilling fluid density ($\rho_m$), total nozzle area ($A_n$) are as defined previously, and the constant $K_7$ depends on the unit system.

The magnitude of the mechanical power input to the bit directly affects the volume of cuttings generated as drilling proceeds. The magnitude of the hydraulic power supplied to the bit directly affects its ability to clean the cutting structure and hole bottom. The MP input also directly affects the amount of heat generated at the bit-formation interface during rock cutting, which in turn causes cutter temperature increase and wear. The HP directly affects the convective heat transfer between the cutting structure and the drilling fluid, which in turn affects cutter temperature and wear rate. Preferred embodiments of the invention recognize these balancing considerations and regulate the MP input based on HP input such that $$MP_{max} = K_8 HP \quad (34)$$

The constant $K_8$ in the above expression is preferably specified by the operator.

Figure 22:
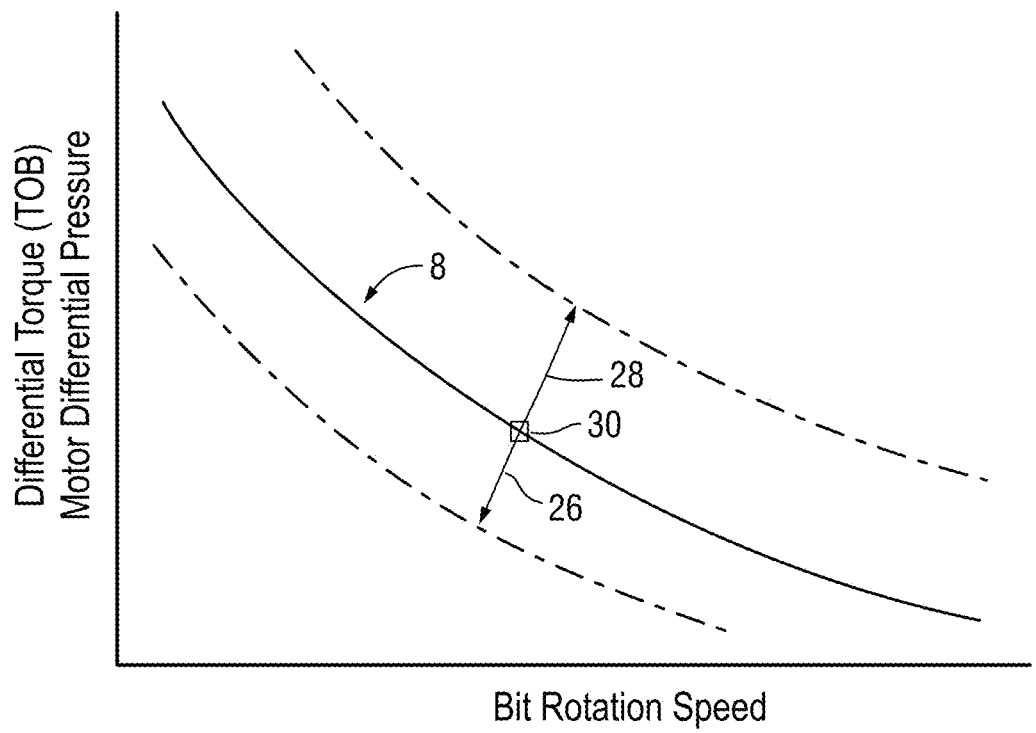
FIG. 22 is a schematic showing examples of simultaneous variations of TOB and bit rotation speed ($\omega_b$) for increments or decrements of mechanical power.

FIG. 22 again presents the TOB versus $\omega_b$ curves at different levels of MP with curve 8 as described above and in which arrows 26, 28 each represent possible stepwise variations of TOB and $\omega_b$ from a setpoint 30 on the curve 8, wherein the variations 26, 28 may be carried out simultaneously and are selected such that the power supplied to the drilling assembly varies substantially linearly with the variations 26, 28, and where variations 26, 28 are linked to variations in HP provided to the bit as per Eq. 34.

The present invention is not limited to the embodiments described above. Therein, various modifications are conceivable within the scope of the appended claims. Alternatively, features of respective embodiments may be combined.

The invention claimed is:

1. A system for controlling a drilling assembly comprising a self-tuning, multivariable controller and an optimization engine, wherein said multivariable controller detects a plurality of drilling variables and adjusts the performance of said drilling assembly based on said plurality of drilling variables and wherein said optimization engine manipulates controller setpoints to optimize drilling parameters based on at least one performance indicator, wherein the at least one performance indicator includes a gradient of a bit rate of penetration versus weight on bit response.

2. The system of claim 1 wherein performance adjustment of said self-tuning, multivariable controller uses at least one manipulated variable wherein said manipulated variable is at least one of a proportional variable, integral variable, and differential variable.

3. The system of claim 2 wherein said at least one manipulated variable comprises one of block descent velocity, drillstring rotation speed, and pump strokes per minute.

4. A system for controlling a drilling assembly comprising a self-tuning, multivariable controller, wherein said multivariable controller detects a plurality of drilling variables and adjusts the performance of said drilling assembly based on said plurality of drilling variables and wherein said system automatically adjusts said setpoints using a system of equations:

$$\text{Target Set Point} = TSP = \frac{K_1}{100}I - K_2\frac{V}{2}$$

$$SP(t) = SP(t - DT) + [TSP - SP(t - DT)]K_3\frac{DT}{100}$$

$$SP(t) = \text{minimum}\left[SP(t), \frac{K_4}{100}I\right]$$

wherein TSP is a target setpoint, SP is a current setpoint, I is an interlock value defining a limit, DT is an algorithm execution time, $K_1$ is a user-specified maximum percentage of said interlock value I that said setpoint can reach, $K_2$ is a user-specified parameter that represents steady-state variation of a control variable, and $K_3$ is a user-specified parameter representing the rate at which said target setpoint is approached per second.

5. A system for controlling a drilling assembly comprising a self-tuning, multivariable controller and an optimization engine, wherein said multivariable controller detects a plurality of drilling variables and adjusts the performance of said drilling assembly based on said plurality of drilling variables and wherein said optimization engine manipulates controller setpoints to optimize drilling parameters based on at least one performance indicator, wherein the at least one performance indicator includes a deviation of a bit (rate of penetration):(weight on bit) data pair from a linear best fit of bit (rate of penetration):(weight on bit) data pairs.

6. A system for controlling a drilling assembly comprising a self-tuning, multivariable controller and an optimization engine, wherein said multivariable controller detects a plurality of drilling variables and adjusts the performance of said drilling assembly based on said plurality of drilling variables and wherein said optimization engine manipulates controller setpoints to optimize drilling parameters based on at least one performance indicator, wherein the at least one performance indicator includes testing the bit rate of penetration versus weight on a bit response for bit flounder using the following criterion:

$$(ROP_2 - ROP_1)\left(\frac{ROP_2}{WOB_2} - \frac{ROP_1}{WOB_1}\right) \geq 0$$

wherein $ROP_1$ is a first rate of penetration, $ROP_2$ is a second rate of penetration, $WOB_1$ is a first weight on bit, and $WOB_2$ is a second weight on bit.

7. A system for controlling a drilling assembly comprising a self-tuning, multivariable controller and an optimization engine, wherein said multivariable controller detects a plurality of drilling variables and adjusts the performance of said drilling assembly based on said plurality of drilling variables and wherein said optimization engine manipulates controller setpoints to optimize drilling parameters based on at least one performance indicator, wherein the at least one performance indicator includes a second order gradient of bit rate of penetration versus weight on bit.

8. A system for controlling a drilling assembly comprising a self-tuning, multivariable controller and an optimization engine, wherein said multivariable controller detects a plurality of drilling variables and adjusts the performance of said drilling assembly based on said plurality of drilling variables and wherein said optimization engine manipulates controller setpoints to optimize drilling parameters based on at least one performance indicator, wherein the at least one performance indicator includes a bit wear parameter as defined by:

$$WP = \frac{\beta WOB \omega_b}{ROP}$$

wherein WP is defined as cutter wear per distance drilled, WOB is defined as weight on bit, ROP is defined as rate of penetration, $\omega_b$ is defined as bit rotary speed, and $\beta$ is a user-defined constant accounting for bit abrasiveness and geometry considerations.

9. A system for controlling a drilling assembly comprising a self-tuning, multivariable controller and an optimization engine, wherein said multivariable controller detects a plurality of drilling variables and adjusts the performance of said drilling assembly based on said plurality of drilling variables and wherein said optimization engine manipulates controller setpoints to optimize drilling parameters based on at least one performance indicator, wherein the at least one performance indicator includes a gradient of a cumulative cost per foot defined with respect to at least one of one of time drilled and distance drilled as illustrated by a formula:

$$\frac{Cost}{Foot} = \frac{Bit\ Cost + Rig\ Rate(Drilling\ Time + Trip\ Time)}{Footage\ Drilled}.$$

10. A system for controlling a drilling assembly comprising a self-tuning, multivariable controller and an optimization engine, wherein said multivariable controller detects a plurality of drilling variables and adjusts the performance of said drilling assembly based on said plurality of drilling variables and wherein said optimization engine manipulates controller setpoints to optimize drilling parameters based on at least one performance indicator, wherein the at least one performance indicator includes a simplified mechanical specific energy defined in an equation:

$$SMSE \equiv \frac{120\pi T \omega}{A_b ROP}$$

wherein ROP is defined as the rate of penetration, $A_b$ defined as the area of the bit, $\omega$ is defined as one of bit rotary speed and surface rotary speed, and T is defined as torque.

11. A system for controlling a drilling assembly comprising a self-tuning, multivariable controller and an optimization engine, wherein said multivariable controller detects a plurality of drilling variables and adjusts the performance of said drilling assembly based on said plurality of drilling variables and wherein said optimization engine manipulates controller setpoints to optimize drilling parameters based on at least one performance indicator, wherein the at least one performance indicator includes a hydraulic specific energy defined in an equation:

$$HSE = K_5 \frac{\rho_m Q^3}{A_b A_n^2 ROP}$$

wherein Q is defined as flow rate, ROP is defined as rate of penetration, $A_b$ is defined as bit area, $\rho_m$ is defined as drilling fluid density, $A_n$ is defined as total nozzle density, and $K_5$ is a user-defined constant.

12. A method of optimizing drilling performance of a drilling assembly for drilling a borehole in an earth formation comprising the steps of:
   selecting a setpoint value of at least one variable drilling parameter;
   operating the drilling assembly to drill the borehole, wherein the at least one variable drilling parameter is set at said setpoint value;
   determining the value of at least one performance indicator;

selecting zero as the next setpoint for the block descent velocity;

determining at least one of a second and third value of the at least one performance indicator using the formula:

$$\tau = \text{time constant} = \frac{WOB}{ROP}\frac{L}{EA}$$

wherein WOB is defined as weight acting on a drill bit disposed on said drill assembly, ROP is defined as a rate at which said drill assembly penetrates a drill site, L is defined as a length of a drill pipe defined by said drill assembly, E is defined as a modulus of elasticity of material comprising a drill pipe disposed on said drill assembly, A is defined as a cross sectional area of said drill pipe; and, at least one of the formulas:

$$ROP(t) = f(BDV) = BDV(t)\left(1 - e^{-\frac{\Delta t}{\tau}}\right) + ROP(t - \Delta t)\left(e^{-\frac{\Delta t}{\tau}}\right)$$

wherein ROP$^{(t)}$ is defined as a rate at which said drill assembly penetrates a drill site as a function of time, wherein said rate is a function of the descent velocity of a block, denoted as BDV, in said drill assembly denoted as f(BDV), wherein $$e^{-\frac{\Delta t}{\tau}}$$

comprises error raised to an exponent equal to a change in time t divided by said time constant τ, ROP is a rate of penetration of said drill assembly, t is a time of measurement, and Δt is a change in time; and, $$-0.95\frac{L}{EA}\frac{\Delta WOB}{\Delta t} = \text{bit } ROP$$

wherein said at least one formula varies said setpoint value of said at least one variable drilling parameter based on the change in value of the at least one performance indicator.

13. The method of claim 12 wherein a change of drilling condition is identified by comparing the at least one performance indicator with at least one standard deviation of said at least one performance indicator.

14. The method of claim 12 wherein the at least one performance indicator includes process gain, $K_P$ defined as:

$$K_P = \frac{CV}{f(BDV)}$$

wherein CV denotes a chosen control variable and f(BDV) denotes drill rate penetration as a function of block descent velocity.

15. The method of claim 12 wherein the at least one performance indicator includes bit aggressiveness, μ, defined as:

$$\text{Aggressiveness} = \mu = \frac{3T}{D_b WOB}$$

wherein WOB is defined as weight on bit, $D_b$ is defined as bit diameter, and T is defined as one of torque on bit and surface torque.

16. A method of optimizing drilling performance of a drilling assembly for drilling a borehole in an earth formation using a system for controlling the drilling assembly, comprising the steps of:

selecting a setpoint value of at least one variable drilling parameter;

operating the drilling assembly to drill the borehole, wherein the at least one variable drilling parameter is set at the setpoint value;

determining the value of mechanical power input to the bit;

determining the value of hydraulic power input to the bit;

varying the setpoint value of said at least one variable drilling parameter such that mechanical power and hydraulic power are related as per the equation:

$$MP_{max} = K_8 HP$$

wherein $MP_{max}$ is defined as maximum mechanical power input, HP is defined as hydraulic power input, and $K_8$ is a user-controlled constant, wherein said system comprises a self-tuning, multivariable controller, wherein said multivariable controller detects a plurality of drilling variables and adjusts the performance of said drilling assembly based on said plurality of drilling variables and wherein said system automatically adjusts said setpoints using a system of equations:

$$\text{Target Set Point} = TSP = \frac{K_1}{100}I - K_2\frac{V}{2}$$

$$SP(t) = SP(t - DT) + [TSP - SP(t - DT)]K_3\frac{DT}{100}$$

$$SP(t) = \text{minimum}\left[SP(t), \frac{K_4}{100}I\right]$$

wherein TSP is a target setpoint, SP is a current setpoint, I is an interlock value defining a limit, DT is an algorithm execution time, $K_1$ is a user-specified maximum percentage of said interlock value I that said setpoint can reach, $K_2$ is a user-specified parameter that represents steady-state variation of the control variable, and $K_3$ is a user-specified parameter representing the rate at which said target setpoint is approached per second.

* * * * *